United States Patent

Takahashi et al.

[11] Patent Number: 6,097,542
[45] Date of Patent: Aug. 1, 2000

[54] OPTICAL SYSTEM HAVING REFLECTING SURFACE OF NON-ROTATIONALLY SYMMETRIC SURFACE CONFIGURATION

[75] Inventors: Junko Takahashi, Atsugi; Koichi Takahashi, Hachioji, both of Japan

[73] Assignee: Olympus Optical Co., Ltd., Tokyo, Japan

[21] Appl. No.: 08/951,044

[22] Filed: Oct. 15, 1997

[30] Foreign Application Priority Data

Oct. 16, 1996 [JP] Japan ................................. 8-273688

[51] Int. Cl.⁷ ................................................. G02B 27/14
[52] U.S. Cl. ............................................. 359/631; 359/630
[58] Field of Search .................................. 359/630, 631, 359/637, 638, 640; 345/7, 8

[56] References Cited

U.S. PATENT DOCUMENTS

| | | | |
|---|---|---|---|
| Re. 27,356 | 5/1972 | La Russa ................................. | 350/157 |
| 4,026,641 | 5/1977 | Bosserman et al. .................... | 350/298 |
| 4,322,135 | 3/1982 | Freeman ................................. | 350/410 |
| 4,669,810 | 6/1987 | Wood ...................................... | 340/908 |
| 4,969,724 | 11/1990 | Ellis ....................................... | 359/631 |
| 5,093,567 | 3/1992 | Staveley ................................. | 250/221 |
| 5,513,041 | 4/1996 | Togino ................................... | 359/631 |
| 5,539,422 | 7/1996 | Heacock et al. ........................ | 345/8 |
| 5,706,136 | 1/1998 | Okuyama et al. ...................... | 359/630 |
| 5,726,807 | 3/1998 | Nakaoka et al. ....................... | 359/631 |
| 5,768,024 | 6/1998 | Takahashi ............................... | 359/631 |

FOREIGN PATENT DOCUMENTS

| | | |
|---|---|---|
| 583 116 | 2/1994 | European Pat. Off. . |
| 687 932 | 12/1995 | European Pat. Off. . |
| 730 183 | 9/1996 | European Pat. Off. . |
| 62-214782 | 9/1987 | Japan . |
| 3-101709 | 4/1991 | Japan . |
| 5-134208 | 5/1993 | Japan . |
| 5-270768 | 10/1993 | Japan . |
| 6-290892 | 11/1994 | Japan . |
| 7-104209 | 4/1995 | Japan . |
| 8-509075 | 9/1996 | Japan . |

*Primary Examiner*—Ricky Mack
*Attorney, Agent, or Firm*—Pillsbury Madison & Sutro LLP

[57] ABSTRACT

An optical system for use, for example, in a head-mounted image display apparatus, which provides an observation image that is clear and has minimal distortion even at a wide field angle. The head-mounted image display apparatus has an image display device (6), and an optical system (9) that leads an image formed by the image display device (6) to an observer's eyeball position (1), without forming an intermediate image, so that the image can be observed as a virtual image. The optical system (9) includes a reflecting surface (4) performing only one reflection, and one or two transmitting surfaces (3). The space between the reflecting surface (4) and the transmitting surfaces (3) is filled with a medium having a refractive index larger than 1. At least the reflecting surface (4) is a non-rotationally symmetric surface configuration having no axis of rotational symmetry in nor out of the surface.

29 Claims, 13 Drawing Sheets

OPTICAL SYSTEM HAVING REFLECTING SURFACE OF NON-ROTATIONALLY SYMMETRIC SURFACE CONFIGURATION

BACKGROUND OF THE INVENTION

1. Field of the Invention

The present invention relates to an optical system having a reflecting surface of non-rotationally symmetric surface configuration. More particularly, the present invention relates to an optical system suitable for use in a head- or face-mounted image display apparatus that can be retained on the observer's head or face.

2. Discussion of Related Art

As an example of a conventional head- or face-mounted image display apparatus, an image display apparatus disclosed in Japanese Patent Application Unexamined Publication (KOKAI) No. 3-101709 (1991) is known. FIG. 19(a) shows the entire optical system of the conventional image display apparatus, and FIG. 19(b) shows a part of an ocular optical system used in the image display apparatus. As illustrated in these figures, in the conventional image display apparatus, an image that is displayed by an image display device is transmitted as an aerial image by a relay optical system that includes a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 20, an image of a CRT is transmitted through a relay optical system to form an intermediate image, and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 21(a) and 21(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 22, an image of an image display device is transferred to a curved object surface by an image transfer device, and the image transferred to the object surface is projected in the air by a toric reflector.

U.S. Reissued Pat. No. 27,356 discloses another type of conventional image display apparatus. As shown in FIG. 23, the apparatus is an ocular optical system designed to project an object surface onto an exit pupil by a semi-transparent concave mirror and a semitransparent plane mirror.

Other known image display apparatuses include those which are disclosed in U.S. Pat. Nos. 4,322,135 and 4,969,724, European Patent No. 0,583,116A2, and Japanese Patent Application Unexamined Publication (KOKAI) No. 7-333551 (1995).

In these conventional techniques, however, a reflecting surface and a transmitting surface, which constitute an optical system, are formed by using a spherical surface, a rotationally symmetric aspherical surface, a toric surface, an anamorphic surface, etc. Therefore, it has heretofore been impossible to favorably correct ray aberration and distortion at the same time.

If an image for observation is not favorably corrected for both aberration and distortion, the image is distorted as it is viewed by an observer. If the observation image is distorted such that images viewed with the user's left and right eyes are not in symmetry with each other, the two images cannot properly be fused into a single image. In the case of displaying a figure or the like, the displayed figure appears to be distorted, making it impossible to correctly recognize the shape of the displayed figure.

SUMMARY OF THE INVENTION

In view of the above-described problems of the conventional techniques, an object of the present invention is to provide an optical system for use, for example, in a head-mounted image display apparatus, which provides an observation image that is clear and has minimal distortion even at a wide field angle.

To attain the above-described object, the present invention provides an optical system disposed between a pupil plane and an image plane. The optical system has only one reflecting surface that gives a converging action to a bundle of light rays and has a curved surface configuration. The curved surface configuration of the reflecting surface is formed from a non-rotationally symmetric surface having only one plane of symmetry in a plane (YZ-plane) containing both the center of the pupil plane and the center of the image plane.

Assuming that a Z-axis is taken in the direction of prolongation of a line segment passing through the center of the pupil plane among line segments defined by an axial principal ray emitted from the center of the image plane and reflected by the reflecting surface to form an optical path extending through the center of the pupil plane, and that a Y-axis is taken in the direction of a line segment perpendicular to the Z-axis in a plane containing a folded line segment along which the axial principal ray is reflected by the reflecting surface, and further that an X-axis is taken in the direction of a line segment perpendicular to both the Z- and Y-axes, it is desirable that the non-rotationally symmetric surface having only one plane of symmetry should be formed on the basis of the following equation:

$$Z = C_2 + C_3 y + C_4 x + C_5 y^2 + C_6 yx + C_7 x^2 + C_8 y^3 + C_9 y^2 x + C_{10} yx^2 +$$
$$C_{11} x^3 + C_{12} y^4 + C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 + C_{23} y^6 + C_{24} y^5 x +$$
$$C_{25} y^4 x^2 + C_{26} y^3 x^3 + C_{27} y^2 x^4 + C_{28} yx^5 + C_{29} x^6 + C_{30} y^7 + C_{31} y^6 x +$$
$$C_{32} y^5 x^2 + C_{33} y^4 x^3 + C_{34} y^3 x^4 + C_{35} y^2 x^5 + C_{36} yx^6 + C_{37} x^7 \ldots$$

where $C_m$ (m is an integer of 2 or higher) are coefficients, and where in order to obtain a surface configuration having only one plane of symmetry in the YZ-plane, all terms with odd-numbered powers of x ($C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $_{33}$, $_{35}$, $C_{37}$, ...) are zero.

The reflecting surface may be formed as a back-coated reflecting mirror provided in a prism member having an entrance surface and an exit surface, which face each other across a medium having a refractive index (n) larger than 1 (n>1), so that the back-coated reflecting mirror reflects a bundle of light rays passing through the medium.

In this case, the entrance and exit surfaces of the prism member may be formed from a single surface, and the single surface, which serves as both the entrance and exit surfaces, may be formed from a non-rotationally symmetric surface having only one plane of symmetry in the YZ-plane.

The single surface, which serves as both the entrance and exit surfaces of the prism member, may be formed such that a region through which a bundle of light rays enters the prism member and a region through which a bundle of light rays exits from the prism member overlap each other in a central portion of the single surface. Alternatively, the single surface, which serves as both the entrance and exit surfaces of the prism member, may be formed such that a region through which a bundle of light rays enters the prism member and a region through which a bundle of light rays exits from the prism member lie in a side-by-side relation to each other on the single surface without overlapping each other.

The prism member may have a group of surfaces having optical actions which consists of three surfaces, i.e. an entrance surface through which a bundle of light rays enters the prism member; a reflecting surface having a back-coated reflecting mirror action; and an exit surface provided in a side-by-side relation to the entrance surface. The three surfaces may be designed to be surfaces that are different from each other.

In this case, the entrance or exit surface of the prism member may be formed from a non-rotationally symmetric surface having only one plane of symmetry in the YZ-plane.

In addition, a lens may be disposed between the prism member and the image plane. It is also possible to dispose a lens between the prism member and the pupil plane.

The reflecting surface may be formed from a surface-coated reflecting mirror that reflects a bundle of light rays in air, which has a refractive index (n) approximately equal to 1 (n≈1). In this case also, a lens may be disposed between the surface-coated reflecting mirror and the image plane. It is also possible to dispose a lens between the surface-coated reflecting mirror and the pupil plane.

The reasons for adopting the above-described arrangements in the present invention, particularly an arrangement in which a plane-symmetry three-dimensional surface is used in an ocular optical system of a head-mounted image display apparatus, together with the functions thereof, will be explained below.

For the convenience of explanation, first, typical ocular optical systems which may be used in a head-mounted image display apparatus according to the present invention will be illustrated with FIGS. 14 to 16.

In FIG. 14, an ocular optical system 9 comprises only a first surface 4. A bundle of light rays emitted from an image display device 6 is reflected by the first surface 4 so as to be projected into an observer's eyeball with the observer's iris position or eyeball rolling center as an exit pupil 1.

In FIG. 15, an ocular optical system 9 comprises a first surface 3 and a second surface 4. A bundle of light rays emitted from an image display device 6 enters the ocular optical system 9 while being refracted by the first surface 3. Then, the light rays are internally reflected by the second surface 4 and refracted by the first surface 3 again so as to be projected into an observer's eyeball with the observer's iris position or eyeball rolling center as an exit pupil 1.

In FIG. 16, an ocular optical system 9 comprises a first surface 3, a second surface 4, and a third surface 5. A bundle of light rays emitted from an image display device 6 enters the ocular optical system 9 while being refracted by the third surface 5. Then, the light rays are internally reflected by the second surface 4 and refracted by the first surface 3 so as to be projected into an observer's eyeball with the observer's iris position or eyeball rolling center as an exit pupil 1.

Thus, in the present invention, the surface numbers ("Nos.") of the ocular optical system 9 are, in principle, given as ordinal numbers in backward ray tracing from the exit pupil 1 to the image display device 6. Typically, the present invention will be described on the assumption that it is applied to the ocular optical system 9 shown in FIG. 14. It should, however, be noted that the present invention is not necessarily limited to the optical system shown in FIG. 14, but may also be applied to any optical system within the scope of the present invention which is limited solely by the appended claims, e.g. the optical systems shown in FIGS. 14 and 16.

Next, a coordinate system used in the following description will be explained.

As shown in FIG. 14, a visual axis 2 is defined by a straight line along which an axial principal ray, which emanates from the center of the exit pupil 1 and reaches the center of the image display device 6 as an image display device for forming an image to be observed, travels until it intersects the first surface of the ocular optical system 9 (the surface 4 in the case of FIG. 14; the surface 3 in the cases of FIG. 15 and FIG. 16). The visual axis 2 is defined as a Z-axis. An axis which perpendicularly intersects the Z-axis and which lies in a plane of decentration of each surface constituting the ocular optical system 9 is defined as a Y-axis. An axis which perpendicularly intersects both the visual axis 2 and the Y-axis is defined as an X-axis.

The following explanation will be made on the basis of backward ray tracing in which light rays are traced from the pupil 1 toward the device (image display device 6) for forming an image to be observed, unless otherwise specified.

In general, aspherical surfaces are used in order to effect favorable aberration correction with a minimal number of surfaces. Spherical lens systems generally adopt an arrangement in which aberrations produced by a spherical surface, such as spherical aberration, coma, and field curvature, are corrected by another surface. In order to reduce various aberrations which would be produced by a spherical surface, an aspherical surface is used. The purpose of using an aspherical surface is to reduce various aberrations which would be produced by one surface and to minimize the number of surfaces used to effect aberration correction, thereby minimizing the number of surfaces constituting the whole optical system.

However, an optical system which is decentered as in the case of an ocular optical system used in a head-mounted image display apparatus according to the present invention suffers from aberrations due to decentration which cannot be corrected by a conventionally employed rotationally symmetric aspherical surface. Aberrations due to decentration include coma, astigmatism, image distortion, field curvature, etc. There are conventional examples in which a toric surface, an anamorphic surface, etc. are used to correct such aberrations. However, in the conventional examples, great importance has been placed on the correction of astigmatism caused by decentration, and there has heretofore been proposed no device which is compact and provides a wide field angle and which is satisfactorily corrected for aberrations including image distortion.

Let us introduce aberration correction techniques proposed so far:

It is stated in detail in Japanese Patent Application No. 5-264828 (1993), filed by the present applicant, that a combination of a concave mirror and a convex mirror exhibits favorable effect in correction of field curvature. Correction of aberration produced by a tilted concave mirror is described, for example, in Japanese Patent Application No. 6-127453 (1994).

Correction of astigmatism produced by a tilted concave mirror is described in Japanese Patent Application No.

6-211067 (1994), filed by the present applicant, and also in Japanese Patent Application No. 6-256676 (1994).

Correction of trapezoidal and bow-shaped image distortions produced by a tilted concave mirror is described in Japanese Patent Application Unexamined Publication (KOKAI) No. 5-303056 (1993).

However, it has heretofore been impossible to correct these aberrations simultaneously and favorably by using a toric surface, an anamorphic surface, a rotationally symmetric aspherical surface, or a spherical surface.

The present invention is characterized by using a plane-symmetry three-dimensional surface which has no axis of rotational symmetry in nor out of the surface and which has only one plane of symmetry to correct the above-described aberrations simultaneously and favorably.

The term "three-dimensional surface" as used in the present invention means a surface which is defined by the following equation:

$$Z = C_2 + C_3 y + C_4 x + C_5 y^2 + C_6 yx + C_7 x^2 + C_8 y^3 + C_9 y^2 x + C_{10} yx^2 +$$
$$C_{11} x^3 + C_{12} y^4 + C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 + C_{23} y^6 + C_{24} y^5 x +$$
$$C_{25} y^4 x^2 + C_{26} y^3 x^3 + C_{27} y^2 x^4 + C_{28} yx^5 + C_{29} x^6 + C_{30} y^7 + C_{31} y^6 x +$$
$$C_{32} y^5 x^2 + C_{33} y^4 x^3 + C_{34} y^3 x^4 + C_{35} y^2 x^5 + C_{36} yx^6 + C_{37} x^7 \ldots$$

That is, three-dimensional surfaces used in the present invention may be expressed by $$Z = \sum_{n=0}^{k} \sum_{m=0}^{n} c_{nm} y^m x^{n-m} \qquad (a)$$

where k, n and m are arbitrary integers.

It should be noted that three-dimensional surfaces used in the present invention are limited to non-rotationally symmetric surfaces having only one plane of symmetry in the YZ-plane; therefore, all terms with odd-numbered powers of x in the above equation ($C_4$, $C_6$, $C_9$. $C_{11}$, $C_{13}$, $C_{15}$, $C_{18}$ $C_{20}$, $C_{22}$, $C_{24}$, $C_{26}$, $C_{28}$, $C_{31}$, $C_{33}$, $C_{35}$, $C_{37}$, . . . ) are zero.

Next, a bow-shaped image distortion produced by a decentered reflecting concave mirror will be described. On account of the disposition of an LCD (liquid-crystal display device), a reflecting surface having the principal optical power of the optical system is decentered, and an image formed by light rays reflected by the reflecting concave mirror has an image distortion due to the decentration. Accordingly, by using a three-dimensional surface as expressed by the above equation (a) as a reflecting surface having the principal optical power of the optical system, the reflecting surface itself can be given a desired tilt in the Y-axis direction at a desired position on the X-axis in a coordinate system in which the direction of decentration is defined as a Y-axis; the direction of the visual axis of the observer's eyeball is defined as a Z-axis; and an axis that perpendicularly intersects both the Y- and Z-axes is defined as an X-axis. By doing so, it is possible to correct image distortions produced by tilted reflecting surfaces, e.g. reflecting surfaces in Examples (described later), and the reflecting concave mirror decentered as described above, particularly an image distortion which occurs in the Y-axis direction, varying according to the image height in the X-axis direction. Consequently, it becomes possible to favorably correct an image distortion in which the horizontal line is observed as being a bow-shaped line.

Next, a trapezoidal distortion produced by a decentered concave mirror will be explained. Let us explain the image distortion by backward ray tracing from the observer's eyeball. Light rays emanating from the eyeball divergently in the X-axis direction are reflected by the second surface, which is decentered, by way of example. At this time, light rays striking the second surface in the positive direction of the Y-axis and light rays striking the second surface in the negative direction of the Y-axis are reflected by the second surface after a considerable difference has been produced between these light rays in terms of divergence in the X-axis direction due to the difference in optical path length between them. Consequently, an image to be observed is formed with a difference in size between an image lying in the positive direction of the Y-axis and an image in the negative direction of the Y-axis. As a result, the observation image has a trapezoidal distortion.

This distortion is produced by a decentered reflecting surface. Therefore, a similar trapezoidal distortion is produced not only by the second surface but also by any decentered reflecting surface of an ocular optical system.

The trapezoidal distortion can also be corrected by using a three-dimensional surface. This is because, as will be clear from the defining equation (a), a three-dimensional surface has terms with odd-numbered powers of Y and terms with even-numbered powers of X, which enable the curvature to be changed in the X-axis direction as desired according to the sign (positive or negative) of the Y-axis.

Next, a rotationally symmetric image distortion will be explained. For example, in an optical system which has a pupil lying away from a reflecting concave mirror having the principal optical power of the optical system and which provides a wide field angle as in the ocular optical system according to the present invention, a rotationally symmetric pincushion distortion occurs to a considerable extent in backward ray tracing from the pupil plane side. The occurrence of such an image distortion can be suppressed by increasing the tilt of the peripheral portions of the reflecting surface.

Next, a rotationally asymmetric field curvature produced by a decentered reflecting concave mirror will be explained. Let us explain the field curvature by backward ray tracing from the observer's eyeball. Light rays emanating from the eyeball divergently in the X-axis direction are reflected by the decentered reflecting concave mirror having the principal optical power of the optical system. The distance to the image surface (i.e. the image display device) from a point on which a light ray impinges is a half of the radius of curvature at the portion on which the light ray impinges. That is, the light rays form an image surface which is tilted with respect to the direction of travel of light rays having been reflected from the decentered concave mirror. Using a three-dimensional surface according to the present invention makes it possible to give desired curvatures in the X- and Y-axis directions at any point relative to the positive and negative directions of the Y-axis. This is because, as will be clear from the defining equation (a), the three-dimensional surface has odd-numbered powers of Y which enable the curvature to be varied as desired according to the sign (positive or negative) of the Y-axis. This is effective in correcting a rotationally asymmetric field curvature, particularly the tilt of the image surface, produced by a decentered reflecting concave mirror.

Next, a rotationally symmetric field curvature will be explained. In general, a reflecting mirror produces a curvature of field along the reflecting surface. It is preferable in order to correct the field curvature to use a three-dimensional surface according to the present invention, which enables a desired curvature to be given at any position.

Astigmatism can be corrected by appropriately changing the difference between the second-order differential or curvature in the X-axis direction and the second-order differential or curvature in the Y-axis direction.

Coma can be corrected by giving a desired tilt in the Y-axis direction at any point on the X-axis on the basis of the same idea as that for a bow-shaped image distortion described above.

In view of the production of optical parts, it is even more desirable to minimize the number of three-dimensional surfaces used. Accordingly, it is preferable to use a plane surface or a spherical surface or a decentered rotationally symmetric surface as at least one of the surfaces constituting the ocular optical system. By doing so, it is possible to improve productivity.

The reflecting concave mirror having the principal optical power of the ocular optical system is preferably formed from a three-dimensional surface. This is effective when it is desired to suppress the occurrence of aberration.

It is possible to suppress the occurrence of comatic aberration by using a three-dimensional surface as a refracting surface in the group of surfaces constituting the ocular optical system. This is because the refracting surface is tilted with respect to the axial principal ray when light rays are refracted by the refracting surface.

By using a three-dimensional surface as the refracting surface facing the image display device, image distortion can be corrected. The reason for this is that the surface facing the image display device is disposed close to the image formation position and therefore enables image distortion to be favorably corrected without aggravating other aberrations.

By using two three-dimensional surfaces for two of the surfaces constituting the ocular optical system, various aberrations can be corrected even more effectively.

By increasing the number of three-dimensional surfaces used in the ocular optical system within the number of surfaces constituting it, even more favorable aberration correction can be made.

In the present invention, the above-described three-dimensional surface is used as at least the reflecting concave mirror having the principal optical power of the ocular optical system, and the surface configuration of the reflecting surface is defined as a plane-symmetry three-dimensional surface which has no axis of rotational symmetry in nor out of the surface and which has only one plane of symmetry. More specifically, when a coordinate system is set as shown for example in FIG. 14, the reflecting surface is formed as a three-dimensional surface having a plane of symmetry in the YZ-plane, which is a plane containing the direction of decentration of the decentered surface. By doing so, the image of the image-formation plane in the backward ray tracing can be made symmetric with respect to the YZ-plane as a plane of symmetry. Thus, the cost for aberration correction can be reduced to a considerable extent.

It should be noted that the term "a reflecting surface having a reflecting action" as used in the present invention includes any reflecting surface having a reflective action, e.g. a totally reflecting surface, a mirror-coated surface, a semitransparent reflecting surface, etc.

When a plane-symmetry three-dimensional surface having only one plane of symmetry is used as at least the reflecting concave mirror having the principal optical power of the ocular optical system, as stated above, it is possible to provide an ocular optical system having a wide field angle and favorably corrected for aberrations by satisfying the following conditions.

First, when X-, Y- and Z-axes are determined according to the above definition, six principal rays among those which emanate from the center of the pupil position and enter the image display device are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in the above Table 1, six principal rays are determined. That is, an axial principal ray emanating from the pupil center and reaching the center of the image display area of the image display device is defined as ②; a principal ray in a field angle direction corresponding to the center of the upper edge of the image field is defined as ①; a principal ray in a field angle direction corresponding to the upper-right corner of the image field is defined as ④; a principal ray in a field angle direction corresponding to the center of the right-hand edge of the image field is defined as ⑤; a principal ray in a field angle direction corresponding to the lower-right corner of the image field is defined as ⑥; and a principal ray in a field angle direction corresponding to the center of the lower edge of the image field is defined by ③. An area where the principal rays ① to ⑥ intersect each particular surface is defined as an effective area. An equation which defines the configuration of each particular surface [i.e. an expression in which the Z-axis is expressed as an axis of the surface, or an expression in which the surface is expressed in the form of Z=f(X,Y) on the assumption that the surface is not decentered] is solved to determine tilts in the Y-axis direction, which corresponds to the decentering direction, of the surface at respective positions where the principal rays ① to ⑥ impinge on the surface in the effective area. The tilts are denoted by DY1 to DY6, and the curvatures in the Y-axis direction at these positions are denoted by CY1 to CY6. The tilts of the surface at these positions in the X-axis direction, which perpendicularly intersects the Y-axis direction, are denoted by DX1 to DX6, and the curvatures in the X-axis direction at these positions are denoted by CX1 to CX6.

Assuming that CX1M and CY1M denote curvatures in the X-and Y-axis directions, respectively, of that portion of the reflecting surface constituting the ocular optical system which is struck by the axial principal ray ② passing through the center of the exit pupil of the ocular optical system and reaching the center of the image to be observed, it is desirable to satisfy both the following conditions:

$$0.001 < |CX1M|(1/\text{millimeter}) \qquad (1\text{-}1)$$

$$0.001 < |CY1M|(1/\text{millimeter}) \qquad (1\text{-}2)$$

These conditions are set because the distance between the pupil and the image-formation plane (i.e. the display plane of the image display device) can be reduced and thus a compact and lightweight head-mounted image display apparatus can be constructed by setting the reflective refracting power for the axial principal ray of the reflecting surface as a plane-symmetry three-dimensional surface to a value other than zero. If $|CX1M|$ or $|CY1M|$ is not larger than the lower limit, i.e. 0.001, it becomes difficult to construct a compact ocular optical system.

It is more desirable to satisfy both the following conditions:

$$-0.0025 > CX1M (1/\text{millimeter}) \tag{1-1'}$$

$$-0.0025 > CY1M (1/\text{millimeter}) \tag{1-2'}$$

By satisfying both the above conditions, a plane-symmetry three-dimensional surface according to the present invention can be effectively introduced into the concave mirror as a surface assigned the largest refracting power in the ocular optical system of the head-mounted image display apparatus, thereby making it possible to favorably correct various aberrations in the entire system, e.g. image distortion, astigmatism, and coma.

It is even more desirable that other surfaces of the ocular optical system or all the reflecting and transmitting surfaces of the ocular optical system should satisfy the following conditions.

$$-0.01 < CX1M < -0.0025 (1/\text{millimeter}) \tag{1-1''}$$

$$-0.01 < CY1M < -0.0025 (1/\text{millimeter}) \tag{1-2''}$$

Assuming that CY2M and CX2M denote curvatures in the Y- and X-axis directions, respectively, of that portion of the reflecting concave mirror having the principal optical power of the ocular optical system which is struck by the axial principal ray ② passing through the center of the exit pupil and reaching the center of the image to be observed, it is desirable to satisfy the following condition:

$$0.1 < |CX2M/CY2M| < 3 \tag{2-1}$$

The condition (2-1) is necessary to satisfy in order to reduce astigmatism produced by the decentered reflecting concave mirror. In the case of a spherical surface, $CX2M/CY2M=1$. However, a decentered spherical surface produces a large amount of aberration such as image distortion, astigmatism, and coma. Therefore, if a decentered surface is formed by using a spherical surface, it is difficult to completely correct astigmatism on the optical axis, and the residual astigmatism makes it difficult to view a clear observation image even at the center of the visual field.

Only when the reflecting surface having the largest reflective refracting power in the optical system is formed from a surface having only one plane of symmetry and the condition (2-1) is satisfied, it becomes possible to correct the aberrations favorably and to view an observation image having no astigmatism even on the optical axis. The upper limit of the condition (2-1), i.e. 3, and the lower limit, i.e. 0.1, are the limits within which astigmatism can be prevented from occurring to a considerable extent.

It is more desirable to satisfy the following condition:

$$0.3 < |CX2M/CY2M| < 2 \tag{2-2}$$

It is even more desirable to satisfy the following condition:

$$0.3 < CX2M/CY2M < 2 \tag{2-3}$$

It is still more desirable to satisfy the following condition:

$$0.5 < CX2M/CY2M < 1.5 \tag{2-4}$$

The meaning of the upper and lower limits of the above conditions (2-2) to (2-4) is the same as in the case of the condition (2-1). However, the tolerance of astigmatism varies according to the pupil diameter of the observer's eyeball, which changes with the brightness of the image for observation. Therefore, the larger the pupil diameter, the more desirable it becomes to satisfy the condition (2-4).

It is still more desirable for all the reflecting surfaces to satisfy at least one of the above conditions (2-1) to (2-4).

Next, conditions concerning the tilt of the reflecting surface will be shown. In a decentered optical system according to the present invention in which the principal refracting power of the whole optical system is given to a reflecting surface, which is a feature of the present invention, the occurrence of a rotationally asymmetric image distortion due to decentration gives rise to a problem. The following conditions are particularly necessary to satisfy in order to correct trapezoidal image distortion such that the respective lengths of the upper side and base of a trapezoid are made equal to each other. To correct the trapezoidal distortion, it is necessary to give a different tilt to the reflecting surface at each image position to thereby correct the distortion. The amount of tilt to be given varies subtly from place to place on the reflecting surface. Therefore, it is desirable from the viewpoint of aberration correction to satisfy the following condition:

$$-0.1 < DXn3 < 0.1 \tag{3-1}$$

where DXn3 denotes the difference DX4−DX6, in which DX4, and DX6 are tilts of the reflecting surface in the X-axis direction of an equation defining the configuration of the surface at portions of the reflecting surface at which the light rays ④ and ⑥ passing at the maximum field angle in the direction X intersect the reflecting surface, respectively.

If DXn3 is not smaller than the upper limit of the condition (3-1), i.e. 0.1, or not larger than the lower limit, i.e. −0.1, the tilt of the surface in the effective area cannot satisfactorily correct image distortions due to decentration. Consequently, a distortion that is not rotationally symmetric becomes undesirably large.

It is more desirable to satisfy the following condition:

$$-0.05 < DXn3 < 0.05 \tag{3-2}$$

It is important to satisfy the condition (3-2) when the observation field angle exceeds 20 degrees.

It is even more desirable to satisfy the following condition:

$$-0.04 < DXn3 < 0.02 \tag{3-3}$$

It is important to satisfy the condition (3-3) when the observation field angle exceeds 30 degrees.

It is still more desirable to satisfy the following condition:

$$0.001 < DXn3 < 0.02 \tag{3-4}$$

It is important to satisfy the condition (3-3) when the observation field angle exceeds 30 degrees. All the conditions (3-2), (3-3) and (3-4) are necessary to satisfy in order to obtain a favorable image-forming performance at a wide observation field angle.

As has been stated above, a decentered surface produces a rotationally asymmetric image distortion owing to the difference in height between light rays impinging on the surface. To correct the image distortion, it is important that the reflecting surface decentered with respect to the axial principal ray should satisfy at least one of the above conditions.

It is still more desirable that all the decentered reflecting and transmitting surfaces should satisfy at least one of the above conditions (3-1) to (3-4), as a matter of course.

Next, conditions for minimizing an asymmetric image distortion due to decentration will be explained. By satisfying the following condition at the reflecting concave mirror having the principal optical power, it is possible to minimize an image distortion in which a horizontal straight line is imaged to be a bow-shaped line. Assuming that DY4, DY6, DY3 and DY1 denote tilts of the reflecting surface in the Y-axis direction of an equation defining the configuration of the reflecting surface, which corresponds to the decentering direction of the surface, at respective points of intersection between the reflecting surface and the principal ray ④ in the field angle direction corresponding to the upper-right corner of the image field, the principal ray ⑥ in the field angle direction corresponding to the lower-right corner of the image field, the principal ray ③ in the field angle direction corresponding to the center of the lower edge of the image field, and the principal ray ① in the field angle direction corresponding to the center of the upper edge of the image field, and that DYn4 denotes each value of the differences DY4–DY6 and DY1–DY3, it is desirable from the viewpoint of aberration correction that all the values of DYn4 should satisfy the following condition:

$$0<|DYn4|<0.5 \quad (4-1)$$

If |DYn4| is not larger than the lower limit of the condition (4-1), i.e. 0, the tilt in the Y-axis direction of the center of the right-end portion of the effective area becomes excessively small, and it becomes impossible to satisfactorily correct bow-shaped field curvature. If |DYn4| is not smaller than the upper limit of the condition (4-1), i.e. 0.5, over-correction results. Consequently, bow-shaped field curvature occurs to a considerable extent in the reverse direction.

It is more desirable to satisfy the following condition:

$$-0.4<DYn4<0.1 \quad (4-2)$$

It is important to satisfy the condition (4-2) when the observation field angle exceeds 20 degrees.

It is even more desirable to satisfy the following condition:

$$-0.25<DYn4<0.1 \quad (4-3)$$

It is important to satisfy the condition (4-3) when the observation field angle exceeds 30 degrees. Both the conditions (4-2) and (4-3) are necessary to satisfy in order to obtain a favorable image at a wide observation field angle.

It is still more desirable that the decentered reflecting concave mirror and transmitting surface should satisfy at least one of the above conditions.

It is still more desirable that the decentered reflecting concave mirror and all the decentered transmitting surfaces should satisfy at least one of the above conditions, as a matter of course.

Next, it is important that the decentered reflecting surface of the ocular optical system should satisfy the following condition. It is an important condition to flatten curvature of field produced by a surface which is decentered and has a power.

Assuming that CYn (n is from 1 to 6) is each of curvatures in the Y-axis direction of the reflecting concave mirror having the principal optical power in the optical system at portions thereof where the surface is struck by the axial principal ray ② and the rays ①, ③ to ⑥ passing at the maximum observation field angles impinge, respectively, and that CYn5 denotes each value of the differences CY4–CY1, CY5–CY2, and CY6–CY3, it is desirable from the viewpoint of aberration correction that all the values CYn5 should satisfy the following condition:

$$-0<|CYn5|<0.1(1/\text{millimeter}) \quad (5-1)$$

If |CYn5| is not smaller than the upper limit of the condition (5-1), i.e. 0.1, or not larger than the lower limit, i.e. 0, the curvatures of the surface in the effective area become excessively different from each other. Consequently, the curvature of the whole effective area of the surface having the reflective refracting power in the ocular optical system undesirably varies to an excessively large extent, making it impossible to obtain a wide and flat image throughout the observation field angle.

It is more desirable to satisfy the following condition:

$$0<|CYn5|<0.01(1/\text{millimeter}) \quad (5-2)$$

It is important to satisfy the condition (5-2) when the observation field angle exceeds 20 degrees.

It is even more desirable to satisfy the following condition:

$$0<|CYn5|<0.004(1/\text{millimeter}) \quad (5-3)$$

It is important to satisfy the condition (5-3) when the observation field angle exceeds 30 degrees.

It is still more desirable to satisfy the following condition:

$$-0.02<CYn5<0.004(1/\text{millimeter}) \quad (5-4)$$

All the conditions (5-2), (5-3) and (5-4) are necessary to satisfy in order to obtain a favorable image at a wide observation field angle.

It is still more desirable that the decentered reflecting concave mirror and transmitting surface should satisfy at least one of the above conditions.

It is still more desirable that the decentered reflecting concave mirror and all transmitting surfaces should satisfy at least one of the above conditions.

It is preferable for the conditions (5-1), (5-2), (5-3) and (5-4) to be as follows:

$$0.0001<|CYn5|<0.1(1/\text{millimeter}) \quad (5-1')$$

$$0.0001<|CYn5|<0.01(1/\text{millimeter}) \quad (5-2')$$

$$0.0001<|CYn5|<0.005(1/\text{millimeter}) \quad (5-3')$$

$$0.0001<|CYn5|<0.004(1/\text{millimeter}) \quad (5-4')$$

Next, conditions concerning the focal length of the optical system according to the present invention will be shown. The optical system according to the present invention is characterized in that a surface thereof is decentered and has a non-rotationally symmetric surface configuration having no axis of rotational symmetry in nor out of the surface. Therefore, it is meaningless to deduce the focal length from a paraxial calculation. Accordingly, the focal length is defined as follows.

The following description will be given by backward ray tracing from the observer's eyeball. A light ray which passes through a point +1 millimeter away from the pupil center in the Y-axis direction and which passes through the center of the image field is traced backwardly, and the reciprocal of the numerical aperture NA of the light ray exiting from the optical system (i.e. the angle formed between the exiting light ray and the axial principal ray) is defined as the focal length Fy6. In this case, it is important that the focal length Fy6 of the ocular optical system should satisfy the following condition:

$$10 < Fy6 < 60 \text{(millimeter)} \quad (6\text{-}1)$$

If Fy6 is not smaller than the upper limit of the condition (6-1), i.e. 60, the observation field angle becomes small, and the overall size of the optical system becomes excessively large. If Fy6 is not larger than the lower limit of the condition, i.e. 10, the ocular optical system may interfere with the observer's eyeball or the observer's face, and aberrations are produced to such an extent that they cannot satisfactorily be corrected. The best value for this condition varies according to the size of the image display device used. Therefore, it is important to take the best value according to the size of the image display device used.

It is more desirable to satisfy the following condition:

$$20 < Fy6 < 50 \text{(millimeter)} \quad (6\text{-}2)$$

It is even more desirable to satisfy the following condition:

$$30 < Fy6 < 40 \text{(millimeter)} \quad (6\text{-}3)$$

Next, a light ray which passes through a point +1 millimeter away from the pupil center in the X-axis direction and which passes through the center of the image field is traced backwardly, and the reciprocal of the numerical aperture NA of the light ray exiting from the optical system (i.e. the angle formed between the exiting light ray and the axial principal ray) is defined as the focal length Fx7. In this case, it is important that the focal length Fx7 of the ocular optical system should satisfy the following condition:

$$10 < Fx7 < 60 \text{(millimeter)} \quad (7\text{-}1)$$

If Fx7 is not smaller than the upper limit of the condition (7-1), i.e. 60, the observation field angle becomes small, and the overall size of the optical system becomes excessively large. If Fx7 is not larger than the lower limit of the condition, i.e. 10, the ocular optical system may interfere with the observer's eyeball or the observer's face, and aberrations are produced to such an extent that they cannot satisfactorily be corrected. The best value for this condition varies according to the size of the image display device used. Therefore, it is important to take the best value according to the size of the image display device used.

It is more desirable to satisfy the following condition:

$$20 < Fx7 < 50 \text{(millimeter)} \quad (7\text{-}2)$$

It is even more desirable to satisfy the following condition:

$$30 < Fx7 < 40 \text{(millimeter)} \quad (7\text{-}3)$$

The following is a description of the relationship between the focal length and the curvature of the reflecting surface. Assuming that the above-defined focal lengths of the ocular optical system are denoted by Fx (=Fx7) and Fy (=Fy6), and that CY2 denotes the curvature of the reflecting surface having the principal optical power of the ocular optical system in the Y-axis direction, which corresponds to the decentering direction, at a position where the reflecting surface is struck by the axial principal ray ② passing through the center of the exit pupil of the ocular optical system and reaching the center of the image to be observed, and CX2 denotes the curvature of the reflecting surface in the X-axis direction at that position, it is important that the values of CX2/Fx and CY2/Fy should satisfy the following conditions:

$$-0.001 < CX2/Fx < 0.001 (\text{mm}^{-2}) \quad (8\text{-}1)$$

$$-0.001 < CY2/Fy < 0.001 (\text{mm}^{-2}) \quad (8\text{-}1')$$

If CX2/Fx or CY2/Fy is not smaller than the upper limit, i.e. 0.001, the size of the ocular optical system becomes large, and aberrations occur to a considerable extent. If CX2/Fx or CY2/Fy is not larger than the lower limit, i.e. −0.001, aberrations are produced to a considerable extent by the reflecting concave mirror having the principal optical power and hence impossible to correct satisfactorily by another surface. The best value for each of the ratios of the curvatures to the focal lengths varies according to the size of the image display device used and the field angle. Therefore, it is important to take the best value for each of the ratios according to the size of the image display device used and the field angle.

It is more desirable to satisfy the following conditions:

$$-0.0005 < CX2/Fx < 0.0005 (\text{mm}^{-2}) \quad (8\text{-}2)$$

$$-0.0005 < CY2/Fy < 0.0005 (\text{mm}^{-2}) \quad (8\text{-}2')$$

It is even more desirable to satisfy the following conditions:

$$-0.0005 < CX2/Fx < 0 (\text{mm}^{-2}) \quad (8\text{-}3)$$

$$-0.0005 < CY2/Fy < 0 (\text{mm}^{-2}) \quad (8\text{-}3')$$

It is still more desirable to satisfy the following conditions:

$$-0.0003 < CX2/Fx < -0.00005 (\text{mm}^{-2}) \quad (8\text{-}4)$$

$$0.0003 < CY2/Fy < -0.00005 (\text{mm}^{-2}) \quad (8\text{-}4')$$

It is important to satisfy the above conditions when the observation field angle is about 30 degrees.

The above conditions (1-1) to (8-4') can be applied not only to a case where any of reflecting surfaces constituting the ocular optical system is formed from a plane-symmetry three-dimensional surface which has no axis of rotational symmetry in nor out of the surface and which has only one plane of symmetry, but also to a case where any of the reflecting surfaces is formed from an anamorphic surface having no axis of rotational symmetry in nor out of the surface, i.e. a non-rotationally symmetric surface configuration having no axis of rotational symmetry in nor out of the surface.

Although the foregoing various conditions have been explained mainly on the assumption that the ocular optical system 9 uses a prism member 9' which has, as shown in FIG. 16, a first surface 3, a second surface 4, and a third surface 5 and in which the space between the three surfaces is filled with a medium having a refractive index (n) larger than 1 (n>1), it should be noted that the above conditions can be similarly applied to a prism member 9' as shown in FIG. 15 or to an ocular optical system comprising only a reflecting surface 4 as shown in FIG. 14.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
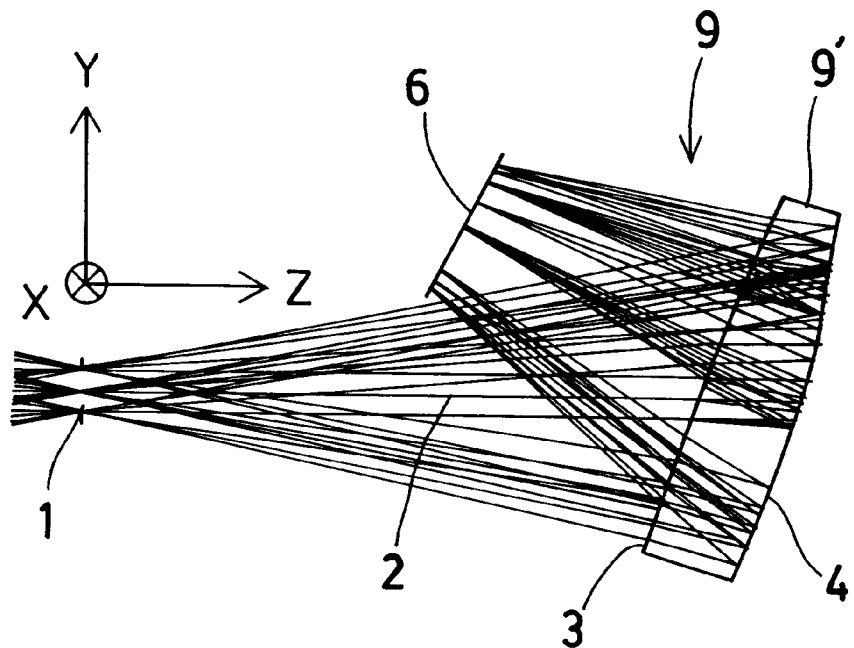
FIG. 1 is a sectional view of an optical system for a single eye of a head-mounted image display apparatus which uses an ocular optical system according to Example 1 of the present invention.

Examples 1 to 7 of the optical system for a head-mounted image display apparatus according to the present invention will be described below. In constituent parameters of each example (described later), as shown in FIG. 1, an exit pupil 1 of an ocular optical system 9 is defined as the origin of the optical system, and an optical axis 2 is defined by a light ray passing through both the center of the display area of an image display device 6 and the center (the origin) of the exit pupil 1. A Z-axis is taken in a direction in which light rays travel from the exit pupil 1 along the optical axis 2. A Y-axis is taken in a direction extending through the center of the exit pupil 1 at right angles to the Z-axis in a plane in which light rays are bent by the ocular optical system 9. An X-axis is taken in a direction extending through the center of the exit pupil 1 at right angles to both the Z- and Y-axes. A direction in which the Z-axis extends from the exit pupil 1 toward the ocular optical system 9 is defined as a positive direction of the Z-axis. A direction in which the Y-axis extends from the optical axis 2 toward the image display device 6 is defined as a positive direction of the Y-axis. A direction in which the X-axis constitutes a right-handed system in combination with the Z- and Y-axes is defined as a positive direction of the X-axis. It should be noted that ray tracing is carried out by backward tracing from the exit pupil 1 of the ocular optical system 9, which is defined as the object side, toward the image display device 6, which is defined as the image plane side.

Regarding each surface for which eccentricities (displacements) Y and Z and tilt angle θ are shown, the eccentricity Y is a distance by which the surface is displaced in the Y-axis direction from the exit pupil 1, which is the origin of the optical system, while the eccentricity Z is a distance by which the surface is displaced in the Z-axis direction from the exit pupil 1, and the tilt angle θ is an angle of inclination with respect to the Z-axis. It should be noted that, for the tilt angle, the counterclockwise direction is defined as a positive direction. Regarding each surface for which a surface separation is shown, the surface and the subsequent surface are coaxial with respect to each other, and the surface separation means the distance between the vertex of the surface and the vertex of the subsequent surface in a direction along the center axis of the surface concerned.

The configuration of an anamorphic surface is defined by the following equation. A straight light that passes through the origin of the surface configuration and that is perpendicular to the optical surface is the axis of the anamorphic surface.

$$Z = (CX \cdot x^2 + CY \cdot y^2)/\left[1 + \{1 - (1 + K_x)CX^2 \cdot x^2 - (1 - K_y)CY^2 \cdot y^2\}^{1/2}\right] +$$
$$AR\{(1 - AP)x^2 + (1 + AP)y^2\}^2 + BR\{(1 - BP)x^2 + (1 + BP)y^2\}^3 +$$
$$CR\{(1 - CP)x^2 + (1 + CP)y^2\}^4 + DR\{(1 - DP)x^2 + (1 + DP)y^2\}^5 \ldots$$

where Z is the amount of deviation from a plane tangent to the origin of the surface configuration; CX is the curvature in the X-axis direction; CY is the curvature in the Y-axis direction; $K_x$ is the conical coefficient in the X-axis direction; $K_y$ is the conical coefficient in the Y-axis direction; AR, BR, CR and DR are rotationally symmetric 4th-, 6th-, 8th- and 10th-order aspherical coefficients, respectively; and AP, BP, CP and DP are asymmetric 4th-, 6th-, 8th- and 10th-order aspherical coefficients, respectively. It should be noted that in the constituent parameters of the examples (described later), the following parameters are employed:

$R_x$: the radius of curvature in the X-axis direction $R_y$: the radius of curvature in the Y-axis direction The curvature radii are related to the curvatures CX and CY as follows:

$$R_x = 1/CX, R_y = 1/CY$$

The configuration of a three-dimensional surface is defined by the following equation. The Z-axis of the defining equation is the axis of the three-dimensional surface.

$$Z = C_2 + C_3 y + C_4 x + C_5 y^2 + C_6 yx + C_7 x^2 + C_8 y^3 + C_9 y^2 x + C_{10} yx^2 +$$
$$C_{11} x^3 + C_{12} y^4 + C_{13} y^3 x + C_{14} y^2 x^2 + C_{15} yx^3 + C_{16} x^4 + C_{17} y^5 +$$
$$C_{18} y^4 x + C_{19} y^3 x^2 + C_{20} y^2 x^3 + C_{21} yx^4 + C_{22} x^5 + C_{23} y^6 + C_{24} y^5 x +$$
$$C_{25} y^4 x^2 + C_{26} y^3 x^3 + C_{27} y^2 x^4 + C_{28} yx^5 + C_{29} x^6 + C_{30} y^7 + C_{31} y^6 x +$$
$$C_{32} y^5 x^2 + C_{33} y^4 x^3 + C_{34} y^3 x^4 + C_{35} y^2 x^5 + C_{36} yx^6 + C_{37} x^7 \ldots$$

The term concerning an aspherical surface for which no data is shown is zero. The refractive index is expressed by the refractive index for the spectral d-line (wavelength: 587.56 nanometers). Lengths are given in millimeters.

FIGS. 1 to 7 are sectional views of Examples 1 to 7 taken along the YZ-plane containing the optical axis 2. In these examples, an ocular optical system 9 comprises a prism member 9' consisting essentially of one, two or three optical surfaces. In some examples (Examples 3, 4 and 6), the ocular optical system 9 further comprises an optical refracting member, e.g. a lens. The space between the two or three surfaces of the prism member 9' is filled with a medium having a refractive index larger than 1.

An ocular optical system 9 according to Example 1 is arranged as shown in FIG. 1. Display light from an image display device 6 enters a prism member 9' through a first surface 3 which is a decentered transmitting surface facing both the image display device 6 and the exit pupil 1. The incident light is reflected by a second surface 4 which is a decentered reflecting surface disposed on the optical axis 2 to face the exit pupil 1. The reflected light exits from the prism member 9' through the first surface 3, which is a transmitting surface. Then, the light travels along the optical axis 2 and enters an observer's pupil placed at the exit pupil 1, without forming an intermediate image, thus forming a display image on the retina of the observer's eye. Thus, in this example, a single surface 3 is arranged such that it serves as both an entrance surface and an exit surface, and a region through which a bundle of light rays enters the prism member 9' and a region through which a bundle of light rays exits from the prism member 9' overlap each other on the surface 3 as shown in FIG. 1. Accordingly, the size of the transmitting surface 3 of the prism member 9' can be reduced by an amount corresponding to the size of the overlap area.

Figure 2:
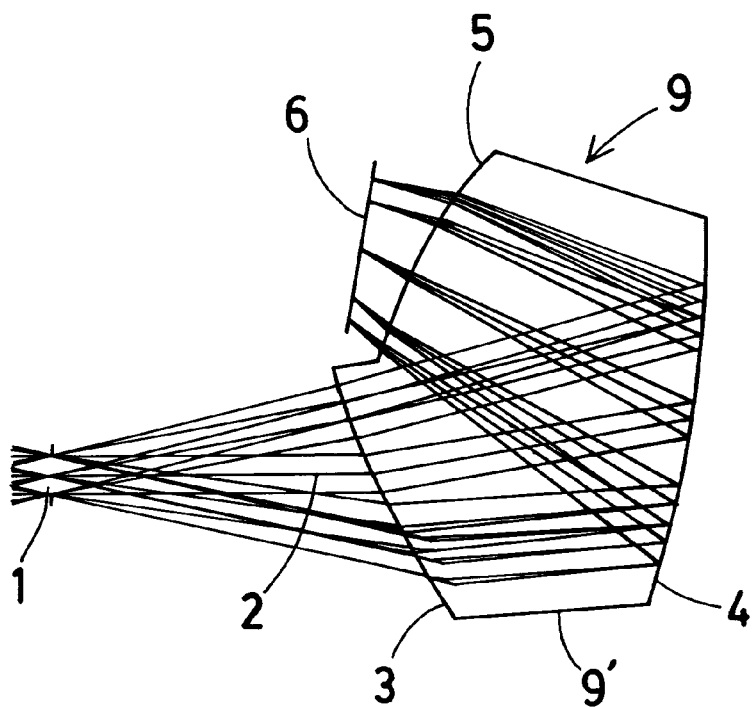
FIG. 2 is a sectional view of an optical system for a single eye of a head-mounted image display apparatus which uses an ocular optical system according to Example 2 of the present invention.

An ocular optical system 9 according to Example 2 is arranged as shown in FIG. 2. Display light from an image display device 6 enters a prism member 9' through a third surface 5 which is a transmitting surface facing the image display device 6. The incident light is reflected by a second surface 4 which is a decentered reflecting surface disposed on the optical axis 2 to face the exit pupil 1. The reflected light exits from the prism member 9' through a first surface 3 which is a transmitting surface facing the exit pupil 1. Then, the light travels along the optical axis 2 and enters an observer's pupil placed at the exit pupil 1, without forming an intermediate image, thus forming a display image on the retina of the observer's eye.

Figure 3:
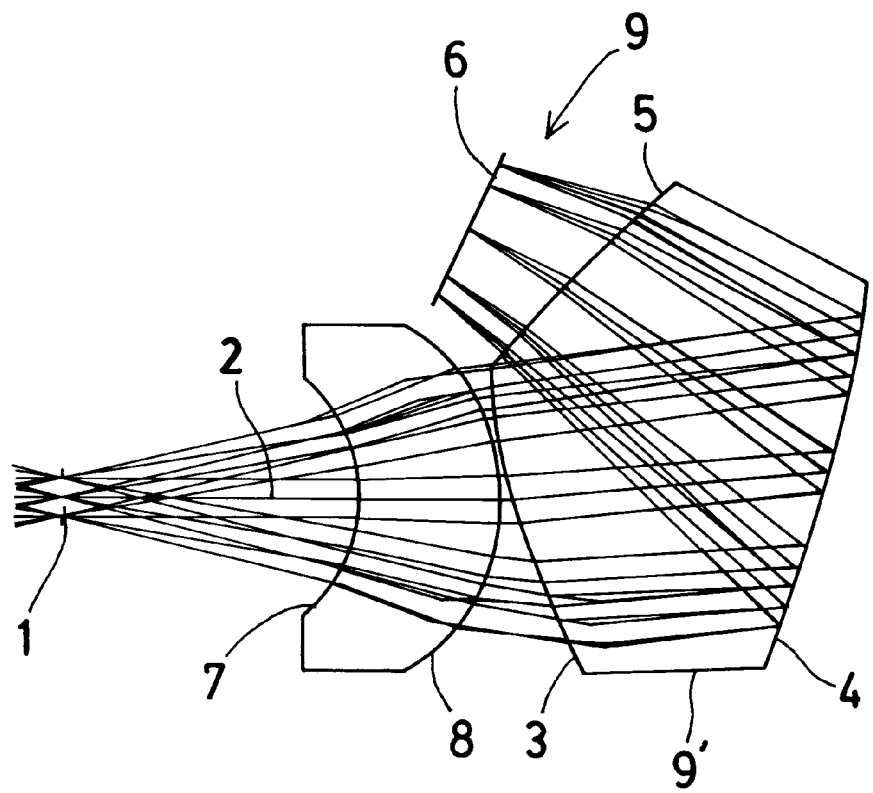
FIG. 3 is a sectional view of an optical system for a single eye of a head-mounted image display apparatus which uses an ocular optical system according to Example 3 of the present invention.

An ocular optical system 9 according to Example 3 is arranged as shown in FIG. 3. Display light from an image display device 6 enters a prism member 9' through a third surface 5 which is a decentered transmitting surface facing the image display device 6. The incident light is reflected by a second surface 4 which is a decentered reflecting surface disposed on the optical axis 2 to face the exit pupil 1. The reflected light exits from the prism member 9' through a first surface 3 which is a transmitting surface facing the exit pupil 1. Then, the light travels along the optical axis 2, passing through a second surface 8 of a lens as an optical refracting member and further through a first surface 7 of the lens, and enters an observer's pupil placed at the exit pupil 1, without forming an intermediate image, thus forming a display image on the retina of the observer's eye.

Figure 4:
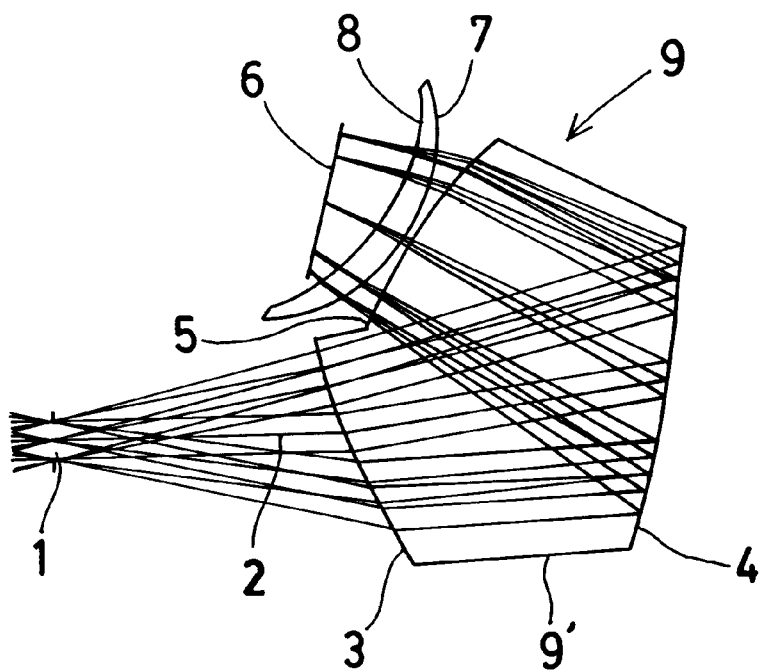
FIG. 4 is a sectional view of an optical system for a single eye of a head-mounted image display apparatus which uses an ocular optical system according to Example 4 of the present invention.

An ocular optical system 9 according to Example 4 is arranged as shown in FIG. 4. Display light from an image display device 6 passes through a second surface 8 of a lens as an optical refracting member disposed to face the image display device 6 and further passes through a first surface 7 of the lens. Then, the light enters a prism member 9' through a third surface 5 which is a transmitting surface facing the image display device 6. The incident light is reflected by a second surface 4 which is a decentered reflecting surface disposed on the optical axis 2 to face the exit pupil 1. The reflected light exits from the prism member 9' through a first surface 3 which is a transmitting surface facing the exit pupil 1. Then, the light travels along the optical axis 2 and enters an observer's pupil placed at the exit pupil 1, without forming an intermediate image, thus forming a display image on the retina of the observer's eye.

Figure 5:
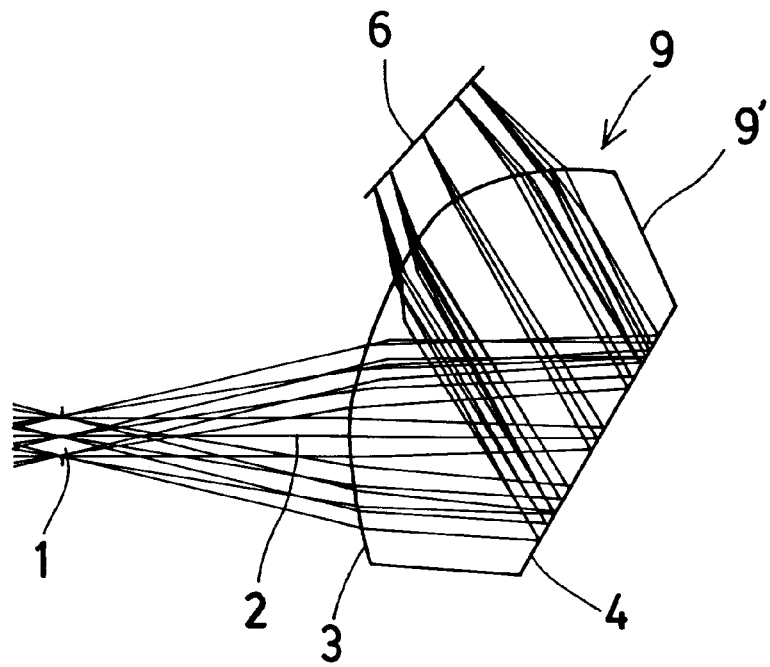
FIG. 5 is a sectional view of an optical system for a single eye of a head-mounted image display apparatus which uses an ocular optical system according to Example 5 of the present invention.

An ocular optical system 9 according to Example 5 is arranged as shown in FIG. 5. Display light from an image display device 6 enters a prism member 9' through a first surface 3 which is a decentered transmitting surface facing the image display device 6. The incident light is reflected by a second surface 4 which is a decentered reflecting surface disposed on the optical axis 2 to face the exit pupil 1. The reflected light exits from the prism member 9' through the first surface 3, which is a transmitting surface. Then, the light travels along the optical axis 2 and enters an observer's pupil placed at the exit pupil 1, without forming an intermediate image, thus forming a display image on the retina of the observer's eye. Thus, in this example, a single surface 3 is arranged such that it serves as both an entrance surface and an exit surface, and that a region through which a bundle of light rays enters the prism member 9' and a region through which a bundle of light rays exits from the prism member 9' are disposed on the surface 3 to lie adjacent to each other without overlapping each other as shown in FIG. 5. Accordingly, the distance between the image plane 6 and the pupil plane 1 can be spaced apart from each other. Therefore, it is possible to increase the degree of freedom with which the ocular optical system 9 can be arranged by taking into consideration the image display device 6, the observer's eyeball position, etc. when it is incorporated into an apparatus. Thus, commercialization of the apparatus is facilitated.

Figure 6:
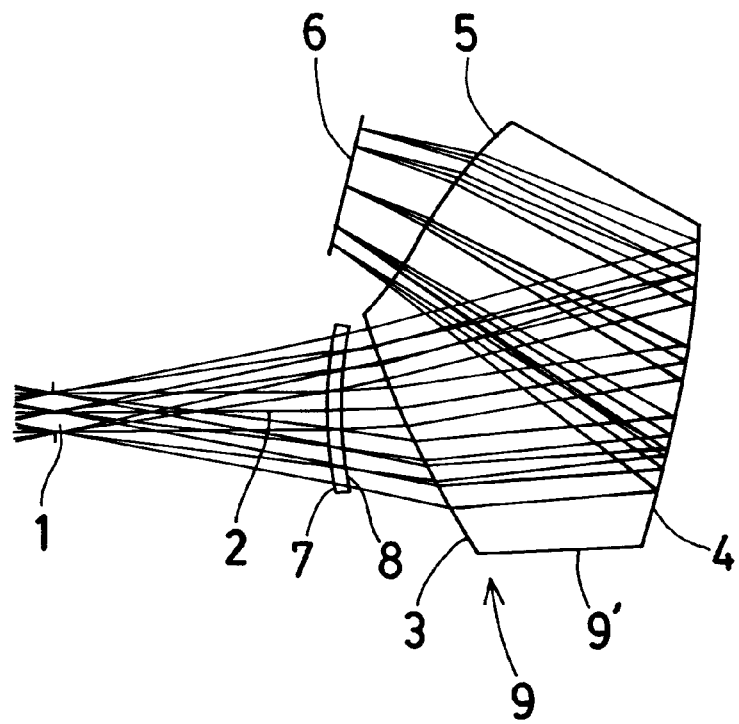
FIG. 6 is a sectional view of an optical system for a single eye of a head-mounted image display apparatus which uses an ocular optical system according to Example 6 of the present invention.

An ocular optical system 9 according to Example 6 is arranged as shown in FIG. 6. Display light from an image display device 6 enters a prism member 9' through a third surface 5 which is a decentered transmitting surface facing the image display device 6. The incident light is reflected by a second surface 4 which is a decentered reflecting surface disposed on the optical axis 2 to face the exit pupil 1. The reflected light exits from the prism member 9' through a first surface 3 which is a transmitting surface facing the exit pupil 1. Then, the light travels along the optical axis 2, passing through a second surface 8 of a lens as an optical refracting member and further through a first surface 7 of the lens, and enters an observer's pupil placed at the exit pupil 1, without forming an intermediate image, thus forming a display image on the retina of the observer's eye.

Figure 7:
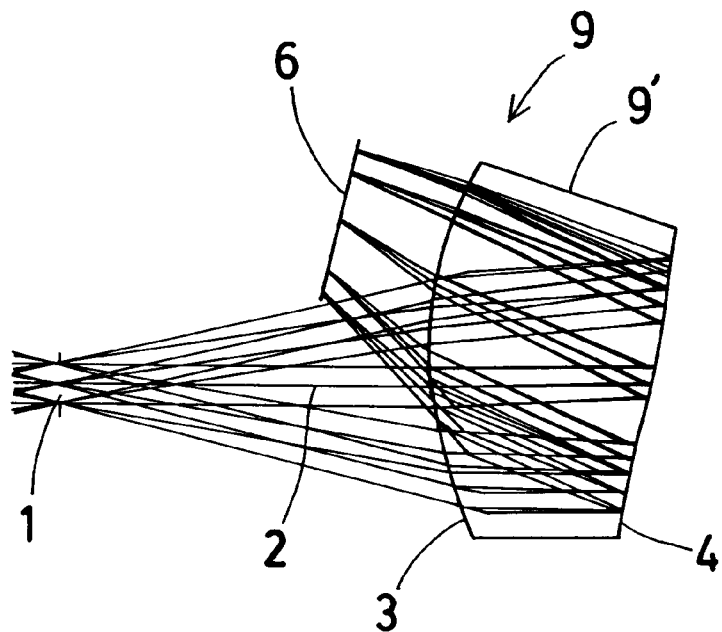
FIG. 7 is a sectional view of an optical system for a single eye of a head-mounted image display apparatus which uses an ocular optical system according to Example 7 of the present invention.

An ocular optical system 9 according to Example 7 is arranged as shown in FIG. 7. Display light from an image display device 6 enters a prism member 9' through a first surface 3 which is a decentered transmitting surface facing the image display device 6. The incident light is reflected by a second surface 4 which is a decentered reflecting surface disposed on the optical axis 2 to face the exit pupil 1. The reflected light exits from the prism member 9' through the first surface 3, which is a transmitting surface. Then, the light travels along the optical axis 2 and enters an observer's pupil placed at the exit pupil 1, without forming an intermediate image, thus forming a display image on the retina of the observer's eye.

Regarding the observation field angles, in Example 1, the horizontal field angle is 30.0°, and the vertical field angle is 22.72°; in Examples 2 to 7, the horizontal field angle is 35.0°, and the vertical field angle is 26.60°. The pupil diameter is 4 millimeters in all Examples 1 to 7.

Constituent parameters in Examples 1 to 7 are as follows:

EXAMPLE 1

| Surface No. | Radius of curvature | Surface separation | Refractive index (Eccentricity) | | Abbe's No. (Tilt angle) |
|---|---|---|---|---|---|
| 1 | ∞(pupil) | | | | |
| 2 (first surface) | Three-dimensional surface(1) | Y<br>Z | 1.5163<br>10.574<br>72.528 | θ | 64.15<br>−19.71° |
| 3 (second surface) (reflecting surface) | Three-dimensional surface(2) | Y<br>Z | 1.5163<br>−0.966<br>79.067 | θ | 64.15<br>−16.74° |
| 4 (first surface) | Three-dimensional surface(1) | Y<br>Z | 10.574<br>72.528 | θ | −19.71° |
| 5 | ∞(display device) | Y<br>Z | 18.039<br>41.957 | θ | −28.07° |

-continued

| Surface No. | Radius of curvature | Surface separation | Refractive index (Eccentricity) | Abbe's No. (Tilt angle) |
|---|---|---|---|---|

Three-dimensional surface(1)

$C_5$ −1.4036 × 10$^{-3}$    $C_7$ 2.0837 × 10$^{-2}$    $C_8$ 2.7346 × 10$^{-4}$
$C_{10}$ −3.5213 × 10$^{-4}$    $C_{12}$ 1.8635 × 10$^{-5}$    $C_{14}$ −2.7597 × 10$^{-5}$
$C_{16}$ −7.5051 × 10$^{-6}$    $C_{17}$ 1.2751 × 10$^{-7}$    $C_{19}$ −9.1456 × 10$^{-8}$
$C_{21}$ 2.4878 × 10$^{-7}$    $C_{23}$ −5.5524 × 10$^{-9}$    $C_{25}$ 8.7937 × 10$^{-9}$
$C_{27}$ 2.1721 × 10$^{-8}$    $C_{29}$ −6.5890 × 10$^{-9}$    $C_{32}$ −2.5109 × 10$^{-10}$

Three-dimensional surface(2)

$C_5$ −4.4170 × 10$^{-3}$    $C_7$ 3.1195 × 10$^{-3}$    $C_8$ −6.1521 × 10$^{-5}$
$C_{10}$ 3.9864 × 10$^{-5}$    $C_{12}$ 1.1317 × 10$^{-6}$    $C_{14}$ −7.0812 × 10$^{-6}$
$C_{16}$ 1.8944 × 10$^{-6}$    $C_{17}$ 1.0254 × 10$^{-7}$    $C_{19}$ −1.0121 × 10$^{-7}$
$C_{21}$ −5.5580 × 10$^{-8}$    $C_{23}$ −8.4480 × 10$^{-10}$    $C_{25}$ 2.9400 × 10$^{-10}$
$C_{27}$ 5.9368 × 10$^{-9}$    $C_{29}$ −2.5243 × 10$^{-9}$    $C_{32}$ 1.4742 × 10$^{-10}$

EXAMPLE 2

| Surface No. | Radius of curvature | Surface separation | Refractive index (Eccentricity) | | Abbe's No. (Tilt angle) |
|---|---|---|---|---|---|
| 1 | ∞(pupil) | | | | |
| 2 (first surface) | Three-dimensional surface(1) | Y<br>Z | 1.5163<br>0.000<br>35.567 | θ | 64.15<br>24.79° |
| 3 (second surface) (reflecting surface) | Three-dimensional surface(2) | Y<br>Z | 1.5163<br>5.402<br>70.723 | θ | 64.15<br>−9.11° |
| 4 (first surface) | Three-dimensional surface(3) | Y<br>Z | 21.138<br>39.783 | θ | −25.12° |
| 5 | ∞(display device) | Y<br>Z | 23.963<br>34.441 | θ | −11.11° |

Three-dimensional surface(1)

$C_5$ 6.8620 × 10$^{-3}$    $C_7$ 7.4153 × 10$^{-3}$    $C_8$ 5.9417 × 10$^{-5}$
$C_{10}$ 2.9033 × 10$^{-5}$    $C_{12}$ −4.6823 × 10$^{-7}$    $C_{14}$ 3.8805 × 10$^{-6}$
$C_{16}$ 5.0284 × 10$^{-7}$    $C_{17}$ 2.3906 × 10$^{-8}$    $C_{19}$ 7.1030 × 10$^{-8}$
$C_{21}$ 2.8323 × 10$^{-8}$

Three-dimensional surface(2)

$C_5$ −3.7101 × 10$^{-3}$    $C_7$ −4.1036 × 10$^{-3}$    $C_8$ 4.2896 × 10$^{-6}$
$C_{10}$ −8.4314 × 10$^{-6}$    $C_{12}$ −8.1477 × 10$^{-8}$    $C_{14}$ 1.1846 × 10$^{-6}$
$C_{16}$ 2.8608 × 10$^{-7}$    $C_{17}$ 8.8332 × 10$^{-9}$    $C_{19}$ 3.2284 × 10$^{-8}$
$C_{21}$ 1.2745 × 10$^{-8}$

Three-dimensional surface(3)

$C_5$ 1.5613 × 10$^{-2}$    $C_7$ 1.5901 × 10$^{-2}$    $C_8$ 3.8223 × 10$^{-4}$
$C_{10}$ −5.9546 × 10$^{-5}$    $C_{12}$ −5.8106 × 10$^{-5}$    $C_{14}$ −4.2859 × 10$^{-5}$
$C_{16}$ −2.2163 × 10$^{-5}$    $C_{17}$ 1.1940 × 10$^{-6}$    $C_{19}$ 2.0760 × 10$^{-6}$
$C_{21}$ 1.0626 × 10$^{-6}$

EXAMPLE 3

| Surface No. | Radius of curvature | Surface separation | Refractive index (Eccentricity) | Abbe's No. (Tilt angle) |
|---|---|---|---|---|
| 1 | ∞(pupil) | | | |
| 2 | Anamorphic | | 1.5163 | 64.15 |

-continued

| Surface No. | Radius of curvature | Surface separation | | Refractive index (Eccentricity) | | Abbe's No. (Tilt angle) |
|---|---|---|---|---|---|---|
| (first surface of lens) | surface(1) | Y<br>Z | 0.000<br>32.98 | | θ | 0.00° |
| 3 (second surface) of lens) | Anamorphic surface(2) | Y<br>Z | 0.000<br>48.98 | | θ | 0.00° |
| 4 (first surface) | Three-dimensional surface(1) | Y<br>Z | 1.482<br>49.601 | 1.5163 | θ | 64.15<br>13.50° |
| 5 (second surface) (reflect-ing surface) | Three-dimensional surface(2) | Y<br>Z | 14.397<br>87.404 | 1.5163 | θ | 64.15°<br>−11.44° |
| 6 (third surface) | Three-dimensional surface(3) | Y<br>Z | −0.145<br>31.124 | | θ | −55.62° |
| 7 | ∞(display device) | Y<br>Z | 29.026<br>45.022 | | θ | −27.20° |

Anamorphic surface(1)

$R_y$ −15.837  $R_x$ −17.686
$K_y$ 0.1536  $K_x$ 0.4575
AR 1.1566 × $10^{-5}$  BR 2.8579 × $10^{-10}$
CR −3.5522 × $10^{-11}$  DR 4.8117 × $10^{-16}$
AP 6.6244 × $10^{-1}$  BP −3.6631
CP 3.7406 × $10^{-1}$  DP −2.7926

Anamorphic surface(2)

$R_y$ −20.701  $R_x$ −21.159
$K_y$ −0.0536  $K_x$ −0.0960
AR 2.3196 × $10^{-6}$  BR 1.7322 × $10^{-10}$
CR 9.1300 × $10^{-13}$  DR −4.3607 × $10^{-15}$
AP 3.9109 × $10^{-1}$  BP −1.7540
CP −7.3242 × $10^{-1}$  DP 6.4705 × $10^{-2}$

Three-dimensional surface(1)

$C_5$ 7.8320 × $10^{-3}$  $C_7$ 1.0289 × $10^{-2}$  $C_8$ −5.9698 × $10^{-5}$
$C_{10}$ 4.3322 × $10^{-5}$  $C_{12}$ −3.0001 × $10^{-6}$  $C_{14}$ −2.0029 × $10^{-6}$
$C_{16}$ −2.8972 × $10^{-6}$  $C_{17}$ −1.5679 × $10^{-8}$  $C_{19}$ −2.0914 × $10^{-7}$
$C_{21}$ −5.5652 × $10^{-8}$

Three-dimensional surface(2)

$C_5$ −2.6831 × $10^{-3}$  $C_7$ −9.5990 × $10^{-4}$  $C_8$ −5.1627 × $10^{-6}$
$C_{10}$ 1.6138 × $10^{-5}$  $C_{12}$ 2.7113 × $10^{-7}$  $C_{14}$ −1.6494 × $10^{-6}$
$C_{16}$ −1.5927 × $10^{-6}$  $C_{17}$ 4.5525 × $10^{-9}$  $C_{19}$ −5.3606 × $10^{-8}$
$C_{21}$ −2.2768 × $10^{-8}$

Three-dimensional surface(3)

$C_5$ −1.0141 × $10^{-2}$  $C_7$ −1.8901 × $10^{-4}$  $C_8$ 2.1790 × $10^{-4}$
$C_{10}$ 6.4305 × $10^{-4}$  $C_{12}$ −1.3340 × $10^{-6}$  $C_{14}$ 2.0106 × $10^{-6}$
$C_{16}$ −4.4426 × $10^{-5}$  $C_{17}$ −2.3707 × $10^{-9}$  $C_{19}$ −1.8828 × $10^{-7}$
$C_{21}$ 6.1283 × $10^{-7}$

EXAMPLE 4

| Surface No. | Radius of curvature | Surface separation | | Refractive index (Eccentricity) | | Abbe's No. (Tilt angle) |
|---|---|---|---|---|---|---|
| 1 | ∞(pupil) | | | | | |
| 2 (first surface) | Three-dimensional surface(1) | Y<br>Z | −17.970<br>42.180 | 1.5163 | θ | 64.15<br>32.92° |
| 3 (second surface) (reflect-ing surface) | Three-dimensional surface(2) | Y<br>Z | −13.540<br>64.042 | 1.5163 | θ | 64.15<br>−18.24° |
| 4 (third surface) | Three-dimensional surface(3) | Y<br>Z | 18.708<br>39.628 | | θ | −31.86° |
| 5 (first surface of lens) | 19.822  3.000 | Y<br>Z | 20.550<br>39.619 | 1.5163 | θ | 64.15<br>143.46° |
| 6 (second surface of lens) | 23.653 | | | | | |
| 7 | ∞(display device) | Y<br>Z | 24.883<br>31.006 | | θ | −15.25° |

Three-dimensional surface(1)

$C_5$ 2.3856 × $10^{-3}$  $C_7$ 6.3806 × $10^{-3}$  $C_8$ 7.4997 × $10^{-5}$
$C_{10}$ −3.9578 × $10^{-5}$  $C_{12}$ −2.5455 × $10^{-8}$  $C_{14}$ 2.2578 × $10^{-6}$
$C_{16}$ −5.8989 × $10^{-7}$

Three-dimensional surface(2)

$C_5$ −3.8769 × $10^{-3}$  $C_7$ −3.7395 × $10^{-3}$  $C_8$ 4.1891 × $10^{-6}$
$C_{10}$ −1.7453 × $10^{-5}$  $C_{12}$ 1.0234 × $10^{-7}$  $C_{14}$ 6.7078 × $10^{-7}$
$C_{16}$ 7.8658 × $10^{-9}$

Three-dimensional surface(3)

$C_5$ 4.7345 × $10^{-3}$  $C_7$ 8.5430 × $10^{-3}$  $C_8$ 4.0971 × $10^{-4}$
$C_{10}$ 1.3860 × $10^{-4}$  $C_{12}$ −1.4006 × $10^{-5}$  $C_{14}$ −7.1817 × $10^{-6}$
$C_{16}$ −5.3051 × $10^{-6}$

EXAMPLE 5

| Surface No. | Radius of curvature | Surface separation | | Refractive index (Eccentricity) | | Abbe's No. (Tilt angle) |
|---|---|---|---|---|---|---|
| 1 | ∞(pupil) | | | | | |
| 2 (first surface) | Three-dimensional surface(1) | Y<br>Z | 16.758<br>36.670 | 1.5163 | θ | 64.15<br>−27.12° |
| 3 (second surface) (reflect-ing surface) | Three-dimensional surface(2) | Y<br>Z | −0.157<br>59.798 | 1.5163 | θ | 64.15<br>−29.77° |
| 4 (first surface) | Three-dimensional surface(1) | Y<br>Z | 16.758<br>36.670 | | θ | −27.12° |
| 5 | ∞(display device) | Y<br>Z | 32.783<br>40.333 | | θ | −44.38° |

Three-dimensional surface(1)

$C_5$ 1.0710 × $10^{-2}$  $C_7$ 1.9479 × $10^{-2}$  $C_8$ 2.6985 × $10^{-4}$
$C_{10}$ 6.1519 × $10^{-4}$  $C_{12}$ 2.8184 × $10^{-5}$  $C_{14}$ 2.9143 × $10^{-5}$
$C_{16}$ −7.7130 × $10^{-6}$  $C_{17}$ 4.6604 × $10^{-7}$  $C_{19}$ 1.6413 × $10^{-7}$
$C_{21}$ −7.0695 × $10^{-7}$

Three-dimensional surface(2)

$C_5$ −1.2816 × $10^{-3}$  $C_7$ −2.1060 × $10^{-3}$  $C_8$ 2.2368 × $10^{-5}$
$C_{10}$ 3.0843 × $10^{-5}$  $C_{12}$ 2.1096 × $10^{-6}$  $C_{14}$ 9.2709 × $10^{-6}$
$C_{16}$ 2.9724 × $10^{-6}$  $C_{17}$ −6.5886 × $10^{-9}$  $C_{19}$ 2.0716 × $10^{-8}$
$C_{21}$ −7.6149 × $10^{-8}$

EXAMPLE 6

| Surface No. | Radius of curvature | Surface separation | Refractive index (Eccentricity) | Abbe's No. (Tilt angle) |
|---|---|---|---|---|
| 1 | ∞(pupil) | | | |
| 2 (first surface of lens) | 27.899 | Y 0.000<br>Z 30.000 | 1.319<br>θ | 1.5163<br>0.00° | 64.15 |
| 3 (second surface of lens) | 34.513 | | | |
| 4 (first surface) | Three-dimensional surface(1) | Y −7.756<br>Z 42.229 | 1.5163<br>θ | 64.15<br>30.40° |
| 5 (second surface) (reflecting surface) | Three-dimensional surface(2) | Y −7.674<br>Z 67.431 | 1.5163<br>θ | 64.15<br>−15.33° |
| 6 (third surface) | Three-dimensional surface(3) | Y 21.122<br>Z 42.046 | θ | −34.88° |
| 7 | ∞(display device) | Y 24.286<br>Z 32.663 | θ | −14.27° |

Three-dimensional surface(1)

$C_5$ 4.6361 × 10$^{-3}$   $C_7$ 6.9249 × 10$^{-3}$   $C_8$ 5.3101 × 10$^{-5}$
$C_{10}$ 2.4197 × 10$^{-5}$   $C_{12}$ −3.6007 × 10$^{-7}$   $C_{14}$ 2.4151 × 10$^{-6}$
$C_{16}$ 1.6217 × 10$^{-6}$   $C_{17}$ 4.9099 × 10$^{-8}$   $C_{19}$ 2.4655 × 10$^{-8}$
$C_{21}$ 4.8582 × 10$^{-8}$

Three-dimensional surface(2)

$C_5$ −4.0484 × 10$^{-3}$   $C_7$ −3.9278 × 10$^{-3}$   $C_8$ 7.6362 × 10$^{-6}$
$C_{10}$ −3.4437 × 10$^{-6}$   $C_{12}$ −9.3507 × 10$^{-8}$   $C_{14}$ 3.1059 × 10$^{-7}$
$C_{16}$ 2.0805 × 10$^{-7}$   $C_{17}$ 2.6970 × 10$^{3\cdot9}$   $C_{19}$ 9.4534 × 10$^{-9}$
$C_{21}$ 1.0515 × 10$^{-8}$ Three-dimensional surface(3)

$C_5$ 9.1083 × 10$^{-3}$   $C_7$ 1.5301 × 10$^{-2}$   $C_8$ 2.1375 × 10$^{-4}$
$C_{10}$ −1.6373 × 10$^{-5}$   $C_{12}$ −3.0260 × 10$^{-5}$   $C_{14}$ −3.0679 × 10$^{-5}$
$C_{16}$ −1.5303 × 10$^{-5}$   $C_{17}$ 4.4659 × 10$^{-7}$   $C_{19}$ 1.2913 × 10$^{-6}$
$C_{21}$ 7.7344 × 10$^{-7}$

EXAMPLE 7

| Surface No. | Radius of curvature | Surface separation | Refractive index (Eccentricity) | Abbe's No. (Tilt angle) |
|---|---|---|---|---|
| 1 | ∞(pupil) | | | |
| 2 (first surface) | Three-dimensional surface(1) | Y −10.123<br>Z 43.489 | 1.5163<br>θ | 64.15<br>20.33° |
| 3 (second surface) (reflecting surface) | Three-dimensional surface(2) | Y 1.103<br>Z 65.000 | 1.5163<br>θ | 64.15<br>−10.31° |
| 4 (first surface) | Three-dimensional surface(1) | Y −10.123<br>Z 43.489 | θ | 20.33° |
| 5 | ∞(display device) | Y 17.608<br>Z 30.846 | θ | −13.99° |

Three-dimensional surface(1)

$C_5$ 1.0401 × 10$^{-2}$   $C_7$ 8.6572 × 10$^{-3}$   $C_8$ 9.8267 × 10$^{-5}$
$C_{10}$ 2.0456 × 10$^{-4}$   $C_{12}$ −9.4226 × 10$^{-6}$   $C_{14}$ 1.6262 × 10$^{-6}$
$C_{16}$ 4.0506 × 10$^{-6}$   $C_{17}$ 3.2669 × 10$^{-7}$   $C_{19}$ 2.1072 × 10$^{-7}$
$C_{21}$ 1.5355 × 10$^{-7}$

Three-dimensional surface(2)

$C_5$ −2.5798 × 10$^{-3}$   $C_7$ −3.0708 × 10$^{-3}$   $C_8$ −3.2024 × 10$^{-5}$
$C_{10}$ −3.3909 × 10$^{-6}$   $C_{12}$ 2.9430 × 10$^{-6}$   $C_{14}$ 4.3427 × 10$^{-6}$
$C_{16}$ 3.4981 × 10$^{-6}$   $C_{17}$ −2.8763 × 10$^{-8}$   $C_{19}$ 4.0895 × 10$^{-8}$
$C_{21}$ 5.4666 × 10$^{-8}$

Values of parameters concerning the conditions (1-1) to (8-1') for the reflecting mirror as the second surface 2 in Examples 1 to 7 are shown in the table below. Example 1 Example 2 Example 3 Example 4 Example 5

| | Example 1 | Example 2 | Example 3 | Example 4 | Example 5 |
|---|---|---|---|---|---|
| CX1M | 0.0062 | −0.0082 | −0.0026 | −0.0076 | −0.0042 |
| CY1M | −0.0086 | −0.0074 | −0.0047 | −0.0066 | −0.0026 |
| CX2M/CY2M | −0.72 | 1.11 | 0.55 | 1.14 | 1.64 |
| DX4-DX6 | −0.031 | 0.002 | 0.006 | 0.006 | 0.007 |
| DY4-DY6 | −0.366 | −0.181 | −0.139 | −0.161 | 0.031 |
| DY3-DY1 | −0.250 | −0.197 | −0.143 | −0.169 | −0.033 |
| CY4-CY1 | −0.0021 | 0.0013 | −0.0015 | 0.0003 | 0.0032 |
| CY5-CY2 | −0.0037 | 0.0007 | 0.0002 | 0.0004 | 0.0029 |
| CY6-CY3 | −0.0037 | 0.0000 | 0.0018 | 0.0004 | 0.0027 |
| Fy6 | 36.33 | 31.75 | 31.61 | 31.81 | 32.94 |
| Fx7 | 37.83 | 32.13 | 32.36 | 31.86 | 32.23 |
| CX2/Fx | 0.00016 | −0.00026 | −0.00008 | −0.00024 | −0.00013 |
| CY2/Fy | −0.00024 | −0.00023 | −0.00015 | −0.00021 | −0.00008 |

| | Example 6 | Example 7 |
|---|---|---|
| CX1M | −0.0078 | −0.0061 |
| CY1M | −0.0075 | −0.0052 |
| CX2M/CY2M | 1.04 | 1.19 |
| DX4-DX6 | 0.014 | 0.019 |
| DY4-DY6 | −0.196 | −0.035 |
| DY3-DY1 | −0.206 | −0.083 |
| CY4-CY1 | 0.0005 | 0.0026 |
| CY5-CY2 | 0.0004 | 0.0020 |
| CY6-CY3 | 0.0002 | 0.0013 |
| Fy6 | 31.71 | 30.82 |
| Fx7 | 31.94 | 30.74 |
| CX2/Fx | −0.00024 | −0.00020 |
| CY2/Fy | −0.00024 | −0.00017 |

Although the ocular optical systems in the above examples are formed by using three-dimensional surfaces defined by the equation (*a*), curved surfaces defined by any defining equation, e.g. anamorphic surfaces, can be used in the present invention. No matter which defining equation is used, an ocular optical system which is considerably favorably corrected for aberrations can be obtained by satisfying any or some of the conditions shown in the present invention. It should be noted that conditional expressions used in conventional non-decentered systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

Figure 8:
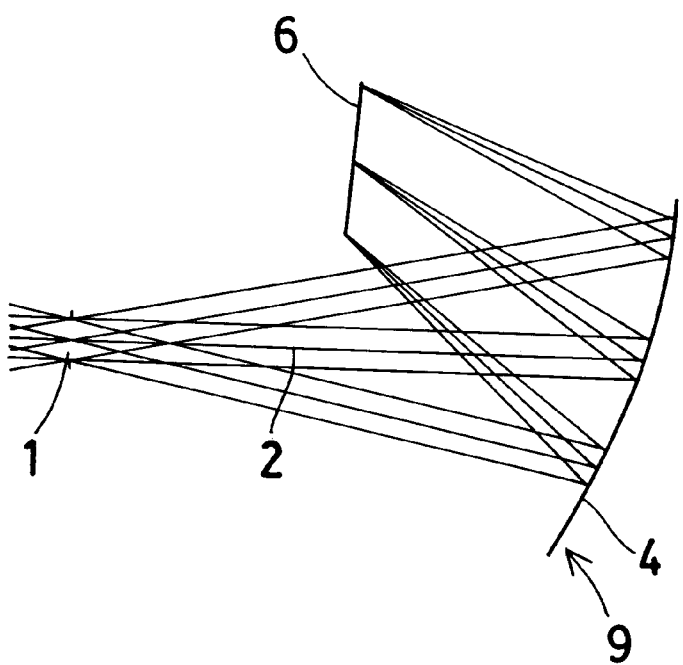
FIG. 8 is a sectional view showing another example of an ocular optical system to which the present invention can be applied.
Figure 9:
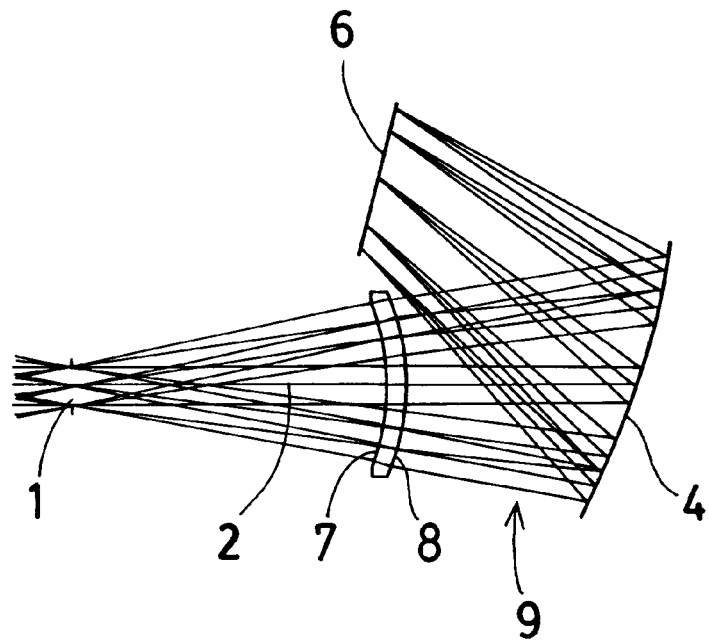
FIG. 9 is a sectional view showing still another example of an ocular optical system to which the present invention can be applied.
Figure 10:
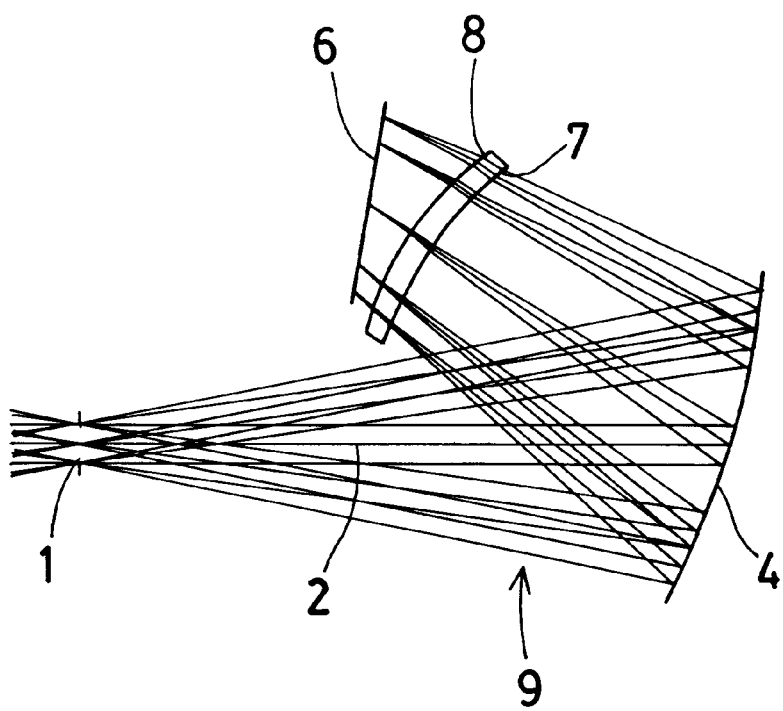
FIG. 10 is a sectional view showing a further example of an ocular optical system to which the present invention can be applied.
Figure 11:
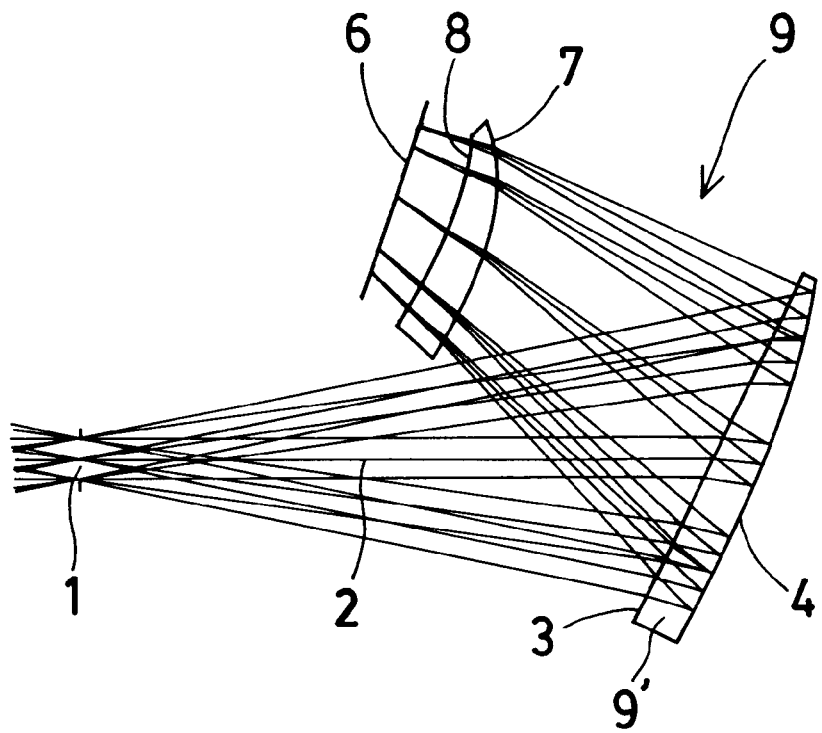
FIG. 11 is a sectional view showing a still further example of an ocular optical system to which the present invention can be applied.
Figure 12:
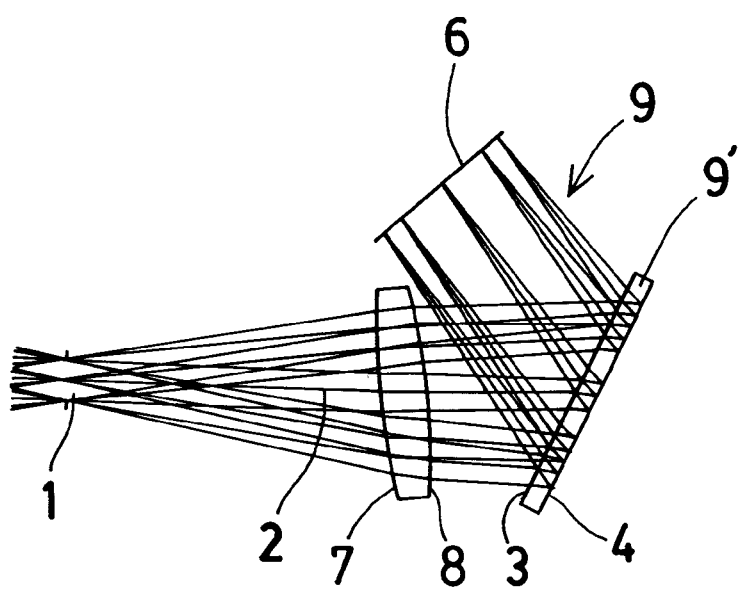
FIG. 12 is a sectional view showing a still further example of an ocular optical system to which the present invention can be applied.
Figure 13:
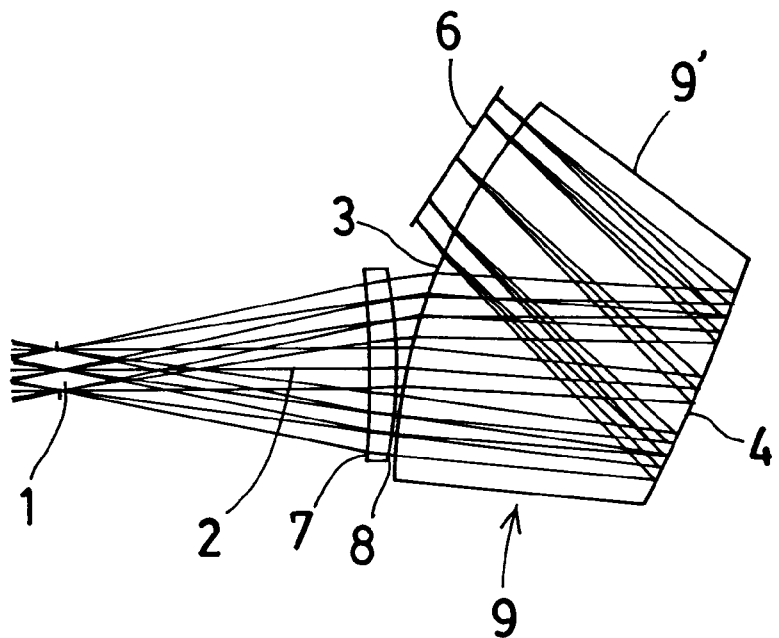
FIG. 13 is a sectional view showing a still further example of an ocular optical system to which the present invention can be applied.
Figure 14:
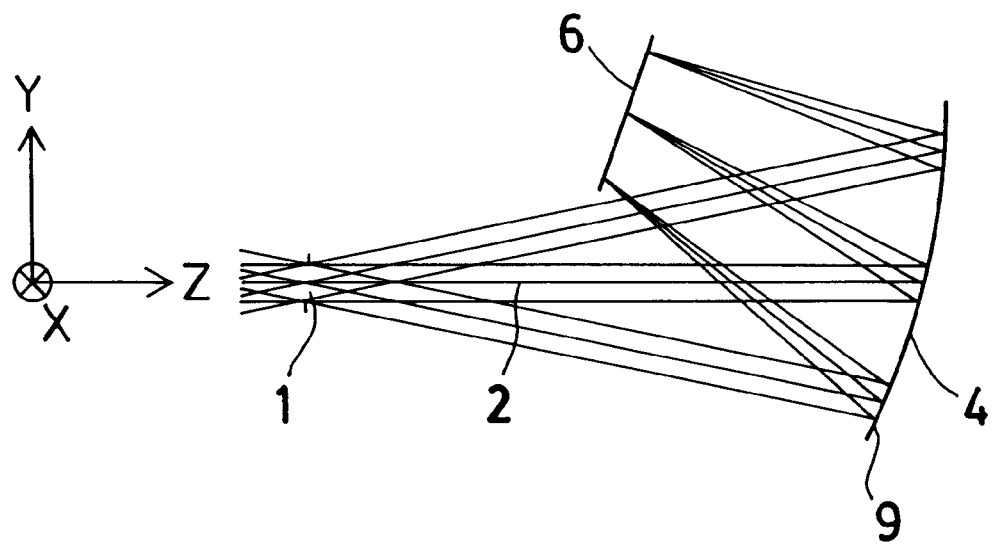
FIG. 14 is a sectional view of a typical ocular optical system used in a head-mounted image display apparatus according to the present invention.
Figure 15:
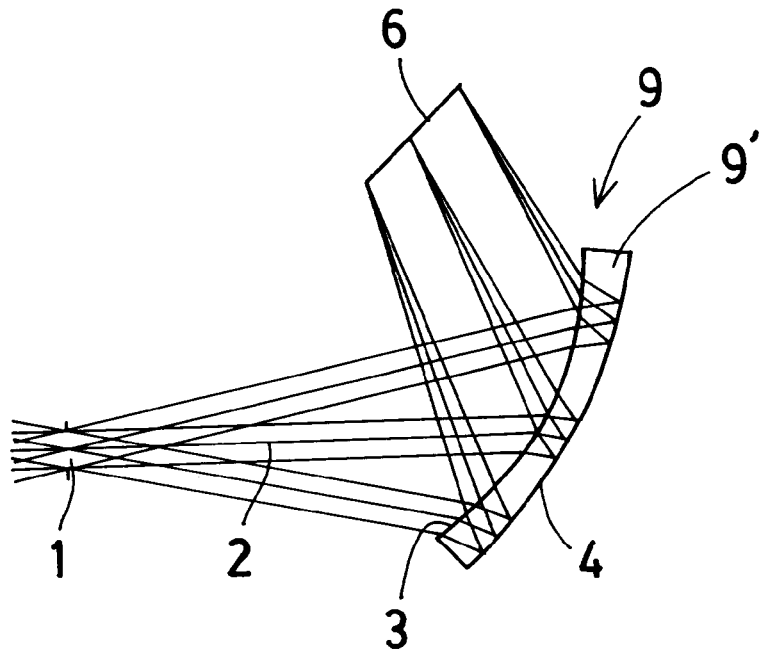
FIG. 15 is a sectional view of another typical ocular optical system used in a head-mounted image display apparatus according to the present invention.
Figure 16:
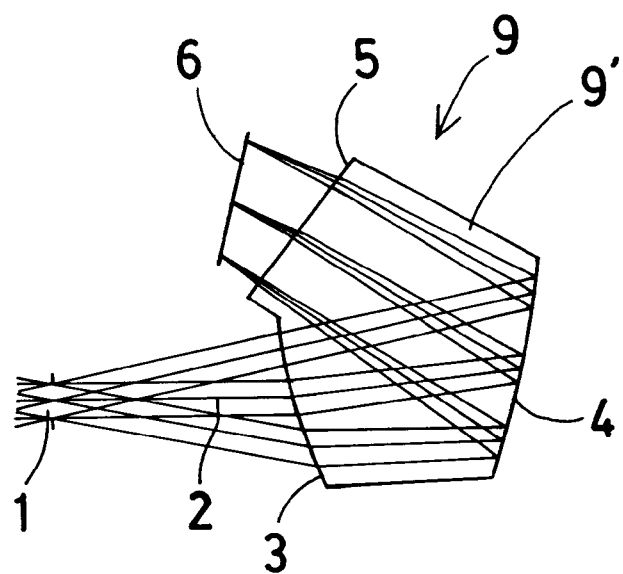
FIG. 16 is a sectional view of still another typical ocular optical system used in a head-mounted image display apparatus according to the present invention.

It should be noted that an ocular optical system used in a head-mounted image display apparatus according to the present invention can adopt not only an arrangement such as those shown in FIGS. 1 to 7 but also an arrangement such as those shown in FIGS. 8 to 13. In these arrangements, reflecting surfaces 4 shown in FIGS. 8 to 10 are each formed as a surface-coated mirror, and prism members 9' shown in FIGS. 11 to 13 are each constructed as a back-coated mirror having a first surface 3 as a transmitting surface and a second surface 4 as a reflecting surface. The other portions of these optical systems will be apparent from the foregoing description and FIGS. 8 to 13; therefore, a description thereof is omitted. A description of constituent parameters of these arrangements is also omitted.

Figure 17:
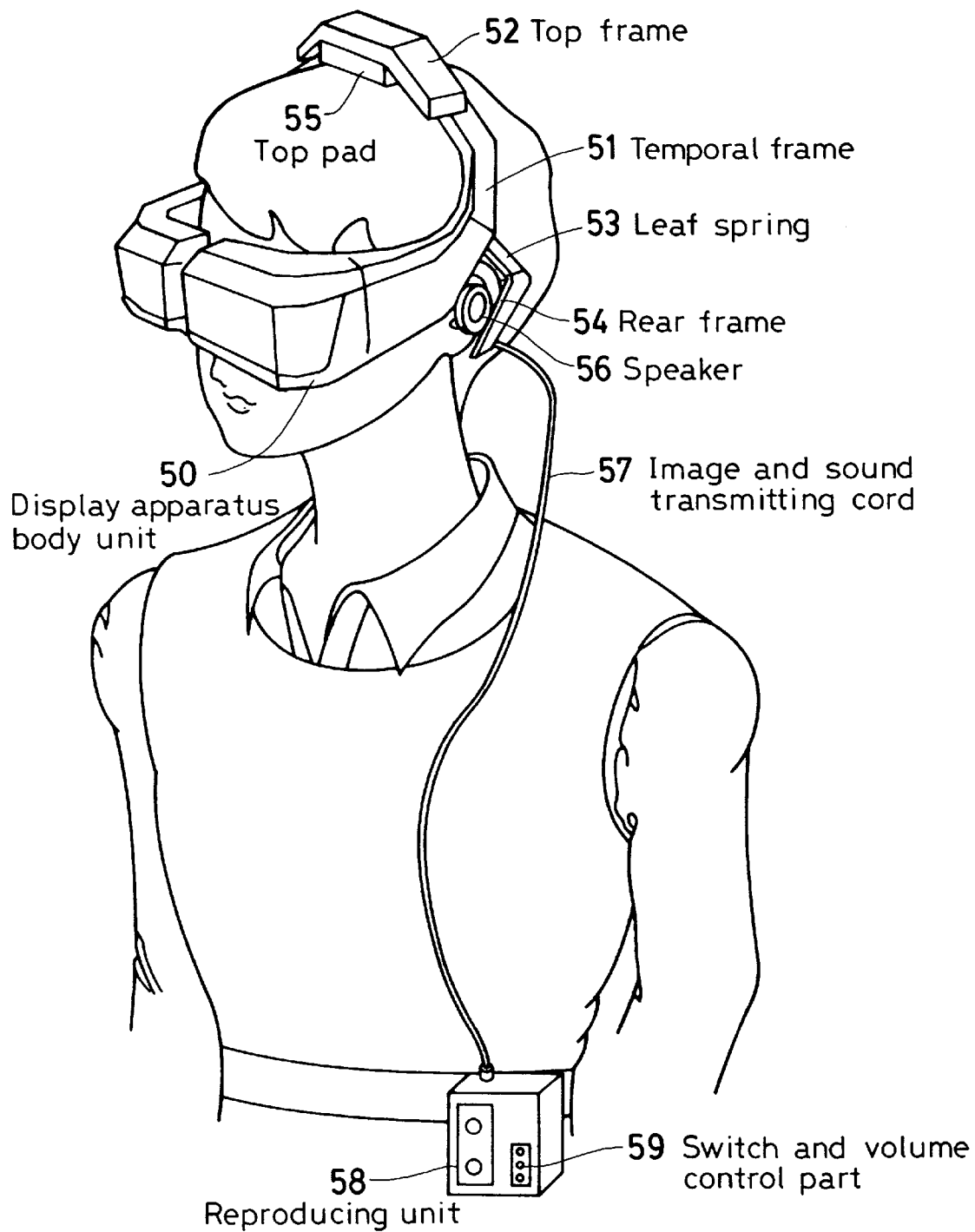
FIG. 17 shows the whole arrangement of an example of a head-mounted image display apparatus according to the present invention.

Incidentally, it is possible to form a portable image display apparatus, such as a stationary or head-mounted image display apparatus, which enables the observer to see with both eyes by preparing a pair of combinations of an ocular optical system according to the present invention, arranged as described above, and an image display device for the left and right eyes, and supporting them apart from each other by the interpupillary distance, i.e. the distance between the two eyes. FIG. 17 shows the whole arrangement of an example of such a portable image display apparatus. A display apparatus body unit 50 contains a pair of left and right ocular optical systems such as those described above, and image display devices comprising liquid-crystal display devices are disposed in the respective image planes of the two ocular optical systems. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears, like the temples of a pair of glasses, and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g. a portable video cassette unit, through an image and sound transmitting cord 57. Therefore, the user can enjoy not only observing an image but also listening to sound with the reproducing unit 58 retained on a desired position, e.g. a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

When the ocular optical system according to the present invention is taken in a wide concept as being one of general optical systems, it can be applied to various apparatuses having an optical system disposed between an image plane and a pupil plane.

Figure 18:
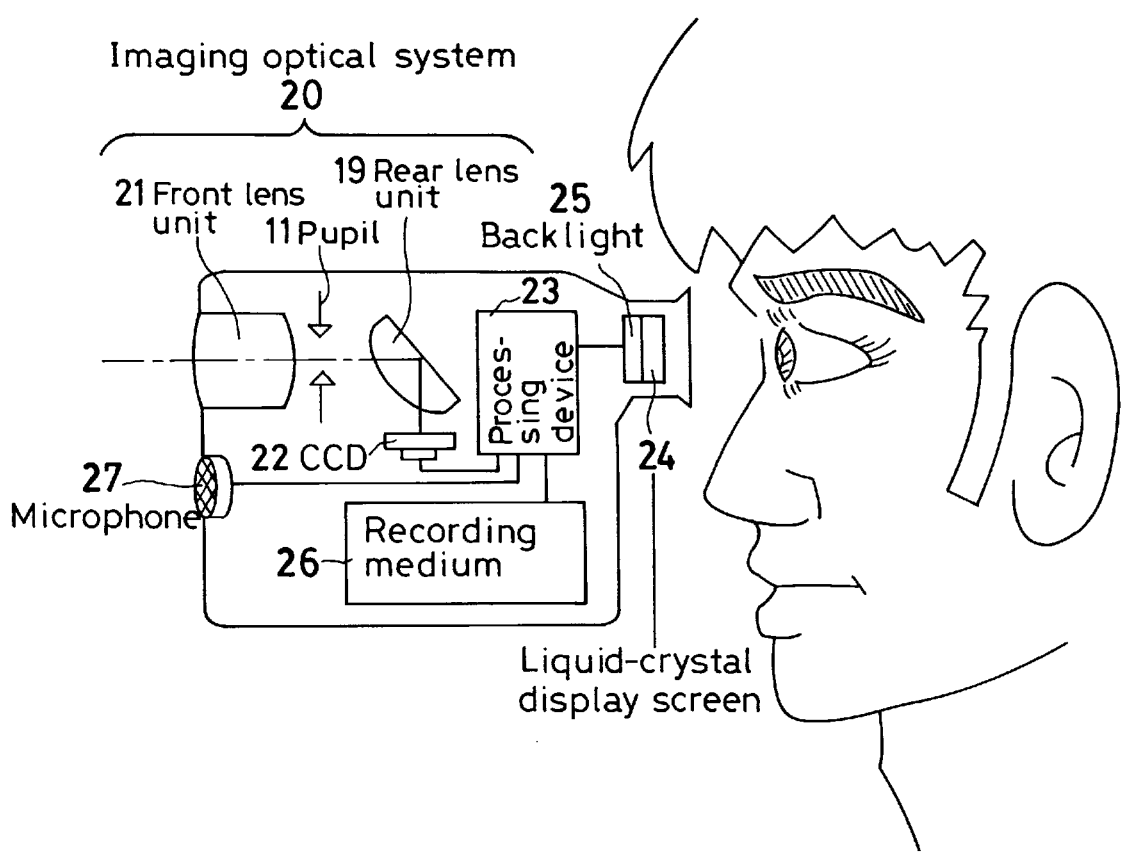
FIG. 18 shows the whole arrangement of an example of an electronic imaging apparatus according to the present invention.
Figure 19A:
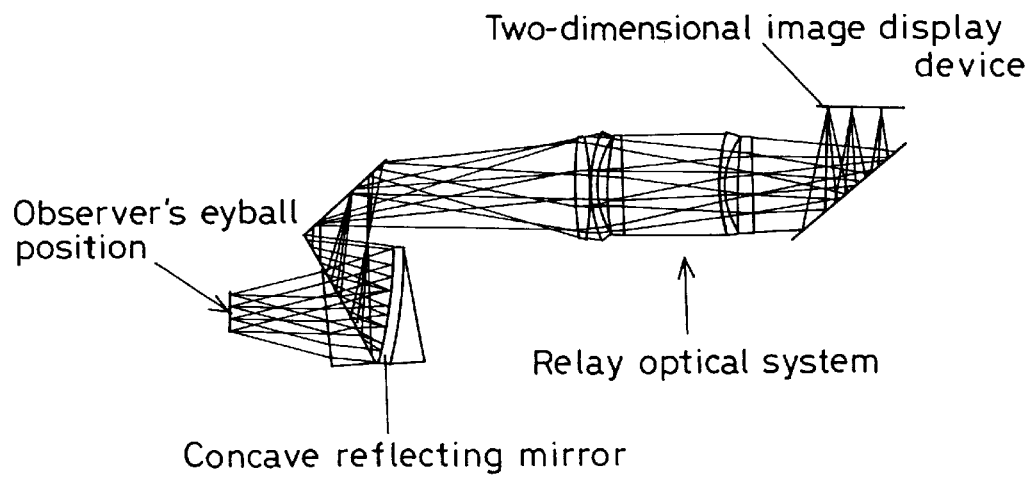
FIGS. 19(a) and 19(b) show an optical system of a conventional head-mounted image display apparatus.
Figure 19B:
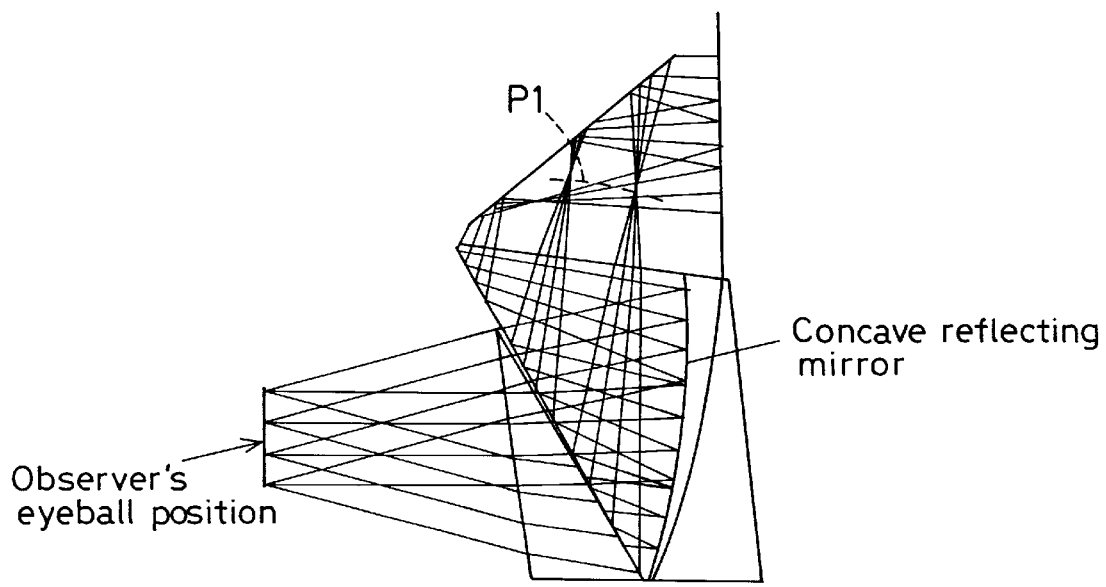
Figure 20:
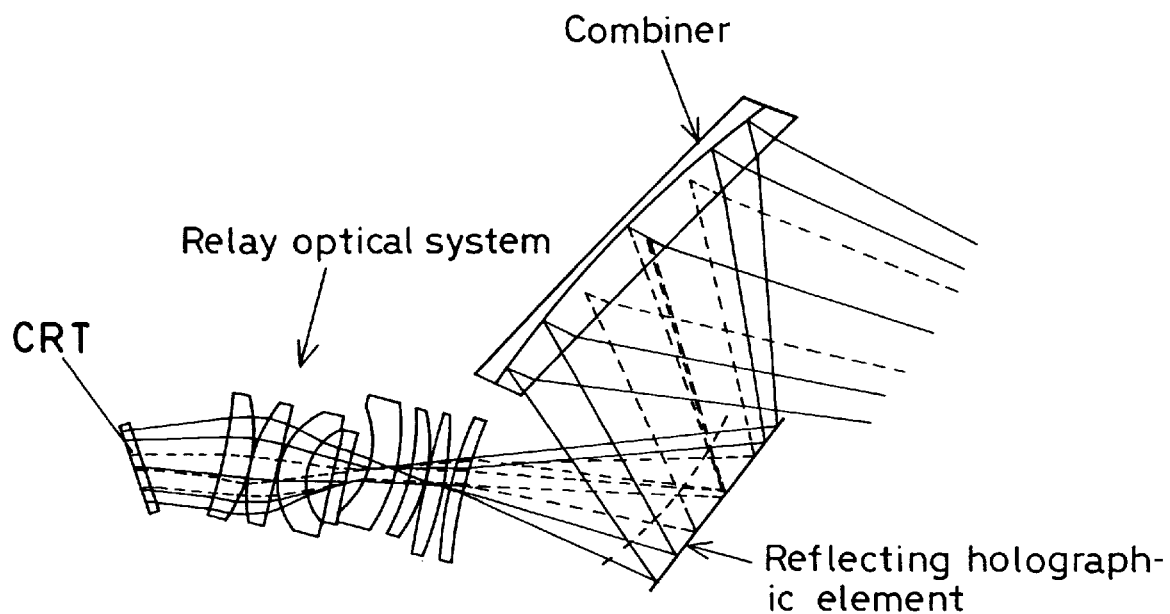
FIG. 20 shows an optical system of another conventional head-mounted image display apparatus.
Figures 21A, 21B:
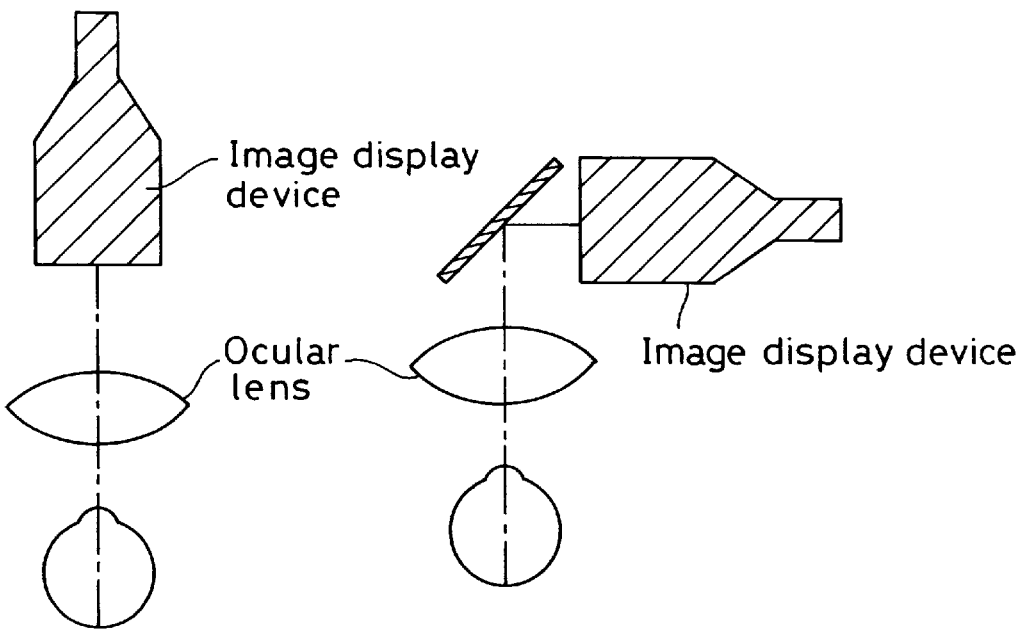
FIGS. 21(a) and 21(b) each show an optical system of still another conventional head-mounted image display apparatus.
Figure 22:
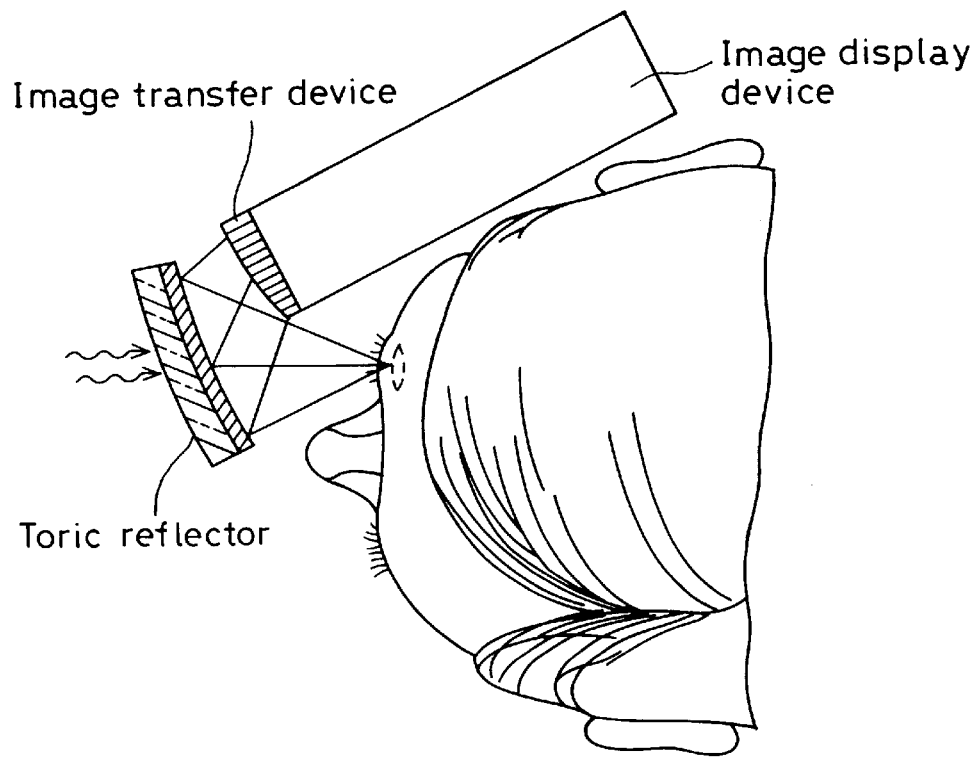
FIG. 22 shows an optical system of a further conventional head-mounted image display apparatus.
Figure 23:
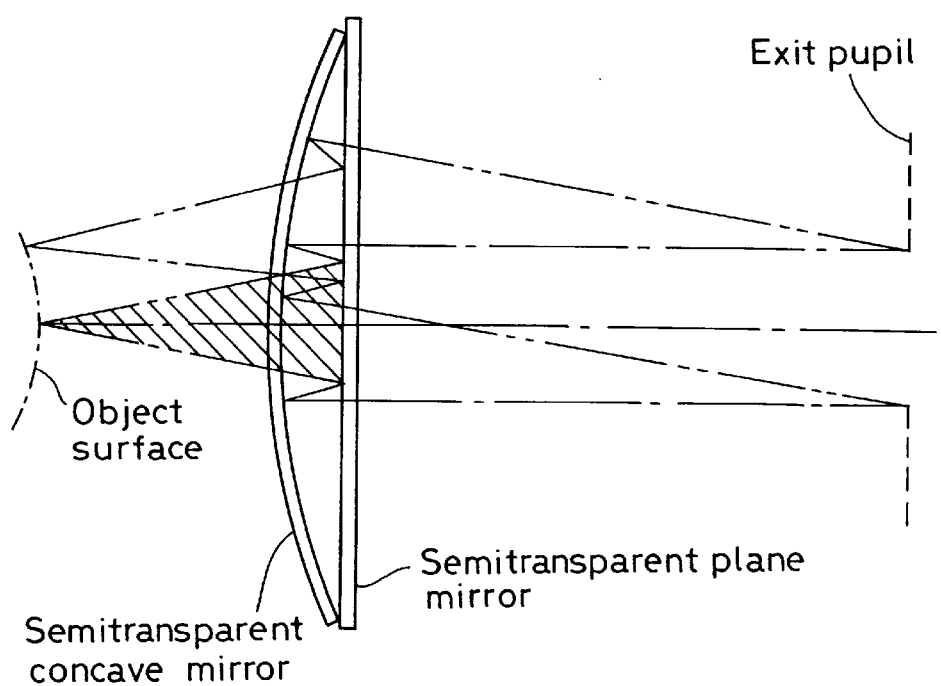
FIG. 23 shows an optical system of a still further conventional head-mounted image display apparatus.

FIG. 18 shows an arrangement in which the ocular optical system 9 shown in Example 5 (FIG. 5) is considered to be one of general optical systems by way of example, and the optical system is disposed between the pupil position of an imaging optical system and an image plane where an object image is formed by the imaging optical system. This example shows the arrangement of an electronic imaging apparatus, e.g. an electronic camera or an electronic still video, which uses an electronic image pickup device as a light-receiving device disposed in the image plane. In an imaging optical system 20 that forms an object image, the optical system 9 (prism member 9') according to the present invention is used as a rear lens unit 19, and a pupil 11 comprising a stop or an aperture is disposed at the position of the pupil 1. A lens unit is disposed as a front lens unit 21 in front of the pupil 11. The imaging optical system 20 may be constructed as a zoom lens system. An object image formed by the imaging optical system 20 is received by an electronic image pickup device (CCD) 22 and converted into an image signal. The image signal is electrically processed by a processing device 23 and thus converted into a signal that can be displayed on a liquid-crystal display screen 24, a CRT screen, etc. and that can be recorded on a recording medium 26, e.g. a magnetic disk or a magnetic tape.

A sound signal simultaneously obtained from a microphone 27 is also electrically processed by the processing device 23 and thus converted into a signal that can be recorded on the recording medium 26. In this example, a liquid-crystal display device is used as a display device. Accordingly, the image signal is displayed on the liquid-crystal display screen, and the displayed image is projected into an observer's eyeball by illuminating light applied from a backlight 25.

In addition, the optical system according to the present invention is also applicable to silver halide cameras using a silver halide film as a light-receiving device and to endoscope systems in which the light-receiving device is replaced by a CCD or fiber bundle for endoscope.

As will be clear from the foregoing description, the present invention makes it possible to provide a head-mounted image display apparatus capable of providing an observation image which is clear and has minimal distortion even at a wide field angle.

What we claim is:

1. An optical system disposed between a pupil plane and an image plane, said optical system comprising only one reflecting surface that gives a converging action to a bundle of light rays and has a curved surface configuration, wherein said curved surface configuration of said reflecting surface is formed from a non-rotationally symmetric surface having only one plane of symmetry in a plane (YZ-plane) containing both a center of said pupil plane and a center of said image plane.

2. An optical system according to claim 1, wherein said reflecting surface is formed as a back-coated reflecting mirror provided in a prism member having an entrance surface and an exit surface, which face each other across a medium having a refractive index (n) larger than 1 (n>1), so that said back-coated reflecting mirror reflects a bundle of light rays passing through said medium.

3. An optical system according to claim 2, wherein the entrance surface and exit surface of said prism member are formed from a single surface.

4. An optical system according to claim 3, wherein said single surface, which serves as both the entrance and exit surfaces, is formed from a non-rotationally symmetric surface having only one plane of symmetry in the YZ-plane.

5. An optical system according to claim 3 or 4, wherein said single surface is formed such that a region through which a bundle of light rays enters said prism member and a region through which a bundle of light rays exits from said prism member overlap each other in a central portion of said single surface.

6. An optical system according to claim 3 or 4, wherein said single surface is formed such that a region through which a bundle of light rays enters said prism member and a region through which a bundle of light rays exits from said prism member lie in a side-by-side relation to each other on said single surface without overlapping each other.

7. An optical system according to claim 2, wherein said prism member has a group of surfaces having optical actions which consists of three surfaces, said three surfaces being an entrance surface through which a bundle of light rays enters said prism member; a reflecting surface having a back-coated reflecting mirror action; and an exit surface provided in a side-by-side relation to said entrance surface, and wherein said three surfaces are designed to be surfaces different from each other.

8. An optical system according to claim 7, wherein the entrance surface of said prism member is formed from a non-rotationally symmetric surface having only one plane of symmetry in the YZ-plane.

9. An optical system according to claim 7, wherein the exit surface of said prism member is formed from a non-rotationally symmetric surface having only one plane of symmetry in the YZ-plane.

10. An optical system according to claim 3 or 7, wherein a lens is disposed between said prism member and said image plane.

11. An optical system according to claim 3 or 7, wherein a lens is disposed between said prism member and said pupil plane.

12. An optical system according to claim 1, wherein said reflecting surface is formed from a surface-coated reflecting mirror that reflects a bundle of light rays in air, which has a refractive index (n) approximately equal to 1 (n≈1).

13. An optical system according claim 12, wherein a lens is disposed between said surface-coated reflecting mirror and said image plane.

14. An optical system according claim 12, wherein a lens is disposed between said surface-coated reflecting mirror and said pupil plane.

15. An optical system according to claim 1, which satisfies the following condition (3-1):

$$-0.1 < DXn3 < 0.1 \quad (3\text{-}1)$$

where DXn3 denotes a difference DX4-DX6 wherein a Y-axis direction is defined as a vertical direction, and DX4 and DX6 are tilts of said reflecting surface in an X-axis direction of an equation defining a configuration of said surface at portions of said reflecting surface at which a principal ray (4) in a field angle direction corresponding to an upper-right corner of an image field and a principal ray (6) in a field angle direction corresponding to a lower-right corner of the image field intersect said reflecting surface, respectively.

16. An optical system according to claim 1, which satisfies the following condition (4-1):

$$0 < |DYn4| < 0.5 \quad (4\text{-}1)$$

where DYn4 denotes each of differences DY4−DY6 and DY3-DY1 wherein a Y-axis direction is defined as a vertical direction, and DY4, DY6, DY3 and DY1 are tilts of said reflecting surface in the Y-axis direction of an equation defining a configuration of said reflecting surface, which corresponds to a decentering direction of said surface, at respective points of intersection between said reflecting surface and a principal ray (4) in a field angle direction corresponding to an upper-right corner of an image field, a principal ray (6) in a field angle direction corresponding to a lower-right corner of the image field, a principal ray (3) in a field angle direction corresponding to a center of a lower edge of the image field, and a principal ray (1) in a field angle direction corresponding to a center of an upper edge of the image field.

17. An optical system according to claim 1, which satisfies the following condition (5-1):

$$0 < |CYn5| < 0.1 (1/\text{millimeter}) \quad (5\text{-}1)$$

where CYn5 denotes each of differences CY4-CY1, CY5-CY2, and CY6-CY3 wherein a Y-axis direction is defined as a vertical direction, and CYn (n is from 1 to 6) is each of curvatures in the Y-axis direction of an equation defining a configuration of said reflecting surface, which corresponds to a decentering direction of said surface, at respective points of intersection between said reflecting surface and a principal ray (1) in a field angle direction corresponding to a center of an upper edge of an image field, an axial principal ray (2) reaching a center of the image field, a principal ray (3) in a field angle direction corresponding to a center of a lower edge of the image field, a principal ray (4) in a field angle direction corresponding to an upper-right corner of the image field, a principal ray (5) in a field angle direction corresponding to a center of a right-hand edge of the image field, and a principal ray (6) in a field angle direction corresponding to a lower-right corner of the image field.

18. An optical system according to claim 15, 16 or 17, which satisfies the following conditions (1-1) and (1-2):

$$0.001 < |CX1M|(1/\text{millimeter}) \quad (1\text{-}1)$$

$$0.001 < |CY1M|(1/\text{millimeter}) \quad (1\text{-}2)$$

where CX1M and CY1M denote curvatures in the X- and Y-axis directions, respectively, of that portion of said reflecting surface which is struck by said axial principal ray.

19. An optical system according to claim 15, 16 or 17, which satisfies the following condition (2-1):

$$0.1 < |CX2M/CY2M| < 3 \quad (2\text{-}1)$$

where CY2M and CX2M denote curvatures in the Y- and X-axis directions, respectively, of that portion of said reflecting surface which is struck by said axial principal ray.

20. An optical system according to claim 15, 16 or 17, which satisfies the following condition (6-1):

$$10 < Fy6 < 60 (\text{millimeter}) \quad (6\text{-}1)$$

where Fy6 denotes a focal length defined such that a light ray which passes through a point +1 millimeter away from a center of an exit pupil of said optical system in the Y-axis direction and which passes through the center of the image field is traced backwardly, and a reciprocal of a numerical aperture NA of the light ray exiting from said optical system, said numerical aperture NA being defined by an angle formed between the exiting light ray and the axial principal ray, is defined as the focal length Fy6.

21. An optical system according to claim 15, 16 or 17, which satisfies the following condition (7-1):

$$10 < Fx7 < 60 \text{(millimeter)} \quad (7\text{-}1)$$

where Fx7 denotes a focal length defined such that a light ray which passes through a point +1 millimeter away from a center of an exit pupil of said optical system in the X-axis direction and which passes through the center of the image field is traced backwardly, and a reciprocal of a numerical aperture NA of the light ray exiting from said optical system, said numerical aperture NA being defined by an angle formed between the exiting light ray and the axial principal ray, is defined as the focal length Fx7.

22. An optical system according to claim 15, 16 or 17, which satisfies the following conditions (8-1) and (8-1'):

$$-0.001 < CX2/Fx < 0.001 \text{(mm}^{-2}) \quad (8\text{-}1)$$

$$-0.001 < CY2/Fy < 0.001 \text{(mm}^{-2}) \quad (8\text{-}1')$$

where Fx denotes a focal length defined such that a light ray which passes through a point +1 millimeter away from a center of an exit pupil of said optical system in the X-axis direction and which passes through the center of the image field is traced backwardly, and a reciprocal of a numerical aperture NA of the light ray exiting from said optical system, said numerical aperture NA being defined by an angle formed between the exiting light ray and the axial principal ray, is defined as the focal length Fx, and Fy denotes a focal length defined such that a light ray which passes through a point +1 millimeter away from the center of the exit pupil of said optical system in the Y-axis direction and which passes through the center of the image field is traced backwardly, and a reciprocal of a numerical aperture NA of the light ray exiting from said optical system, said numerical aperture NA being defined by an angle formed between the exiting light ray and the axial principal ray, is defined as the focal length Fy, and where CY2 and CX2 denote curvatures in the Y- and X-axis directions, respectively, of that portion of said reflecting surface which is struck by said axial principal ray.

23. An image display apparatus according to claim 1, 2, 12, 15, 16 or 17, which includes an image display device disposed such that a surface for forming an image is disposed in said image plane, and said optical system which is formed such that a bundle of light rays emitted from said image display device is led from said pupil plane into an eyeball of an observer through said optical system so that an enlarged virtual image of said image is observed by said observer.

24. A head-mounted image display apparatus according to claim 23, which includes a support member that holds said image display apparatus on a head of said observer so that said image display apparatus lies in front of a face of said observer.

25. A head-mounted image display apparatus according to claim 24, wherein said support member is provided with a speaker unit that transmits sound energy to an ear of said observer.

26. A head-mounted image display apparatus according to claim 24, wherein said image display apparatus is formed so as to be disposed in front of an eye and nose of said observer by a compact display apparatus body unit containing said optical system and said image display device.

27. An imaging apparatus according to claim 2, 12, 15, 16, or 17, which has an imaging optical system that forms an object image on said image plane, and a light-receiving device disposed in said image plane to receive said object image, wherein said optical system having only one reflecting surface is disposed in said imaging optical system.

28. An imaging apparatus according to claim 27, wherein said imaging optical system comprises a front lens unit disposed closer to an object than a pupil thereof, and a rear lens unit including said optical system having only one reflecting surface.

29. An electronic imaging apparatus according to claim 28, wherein said light-receiving device consists of an electronic image pickup device.

* * * * *